(12) United States Patent
Sandbrook

(10) Patent No.: US 11,279,189 B1
(45) Date of Patent: Mar. 22, 2022

(54) WALKING BEAM SUSPENSION

(71) Applicant: Greentech Robotics Limited, Palmerston North (NZ)

(72) Inventor: Donald H. Sandbrook, Palmerston North (NZ)

(73) Assignee: Greentech Robotics Limited, Palmerston North (NZ)

( * ) Notice: Subject to any disclaimer, the term of this patent is extended or adjusted under 35 U.S.C. 154(b) by 0 days.

(21) Appl. No.: 17/174,554

(22) Filed: Feb. 12, 2021

(51) Int. Cl.
*B60G 5/02* (2006.01)

(52) U.S. Cl.
CPC ........ *B60G 5/025* (2013.01); *B60G 2200/318* (2013.01); *B60G 2202/44* (2013.01)

(58) Field of Classification Search
CPC .... B60G 2200/318; B60G 5/025; B60G 5/04; B60G 5/06; B60G 5/02; B60G 2202/44; B60G 5/00
USPC .......................................... 280/676, 677, 682
See application file for complete search history.

(56) References Cited

U.S. PATENT DOCUMENTS

| | | | | |
|---|---|---|---|---|
| 2,312,253 A * | 2/1943 | Konetsky | ............... | B60G 5/047 267/68 |
| 2,316,374 A * | 4/1943 | Townsend | ................ | B60G 5/02 280/677 |
| 2,659,446 A | 11/1953 | Willock | | |
| 2,999,695 A * | 9/1961 | Bixby | ...................... | B60G 5/04 280/681 |
| 3,202,439 A | 8/1965 | Hickman | | |
| 3,241,855 A * | 3/1966 | Kersey | ................... | B62D 63/08 280/679 |
| 3,471,166 A | 10/1969 | Clark | | |
| 3,810,516 A * | 5/1974 | Reimer | ..................... | E02F 5/32 180/24 |
| 3,977,693 A | 8/1976 | Gamaunt | | |
| 6,585,286 B2 | 7/2003 | Adema | | |
| 7,044,070 B2 | 5/2006 | Kaster | | |
| 8,033,376 B2 | 10/2011 | Toews | | |

(Continued)

FOREIGN PATENT DOCUMENTS

| | | | | |
|---|---|---|---|---|
| CA | 2974530 A1 * | 1/2019 | ............... | B60G 5/02 |
| DE | 2548238 A1 * | 5/1976 | ............. | B62D 13/04 |

(Continued)

OTHER PUBLICATIONS https://en.wikipedia.org/wiki/Rocker-bogie; Wikipedia Webpage Article on Rocker-Bogie.

*Primary Examiner* — Paul N Dickson
*Assistant Examiner* — Matthew D Lee
(74) *Attorney, Agent, or Firm* — Neustel Law Offices

(57) ABSTRACT

A walking beam suspension for use with an agricultural vehicle or robot having a chassis and a plurality of wheels on opposite sides of the chassis. The walking beam suspension generally includes first and second walking beams pivotably connected to the opposite sides of the chassis and a dynamic coupling connected between the walking beams and the chassis. As the vehicle traverses the surface the wheels encounter deviations. The walking beams pivot relative to each other and to the chassis to maintain the wheels in contact with the surface. The dynamic coupling dynamically extends and retracts connections between the walking beams and dynamically pivots and linearly moves a connection to the chassis to reduce the transfer of movement caused by the deviations to the chassis.

27 Claims, 26 Drawing Sheets

(56) References Cited

U.S. PATENT DOCUMENTS

| | | |
|---|---|---|
| 9,150,071 B2 | 10/2015 | Noble |
| 10,106,010 B2 | 10/2018 | Fliearman |
| 10,336,380 B2 | 7/2019 | Sakashita |
| 2015/0084301 A1* | 3/2015 | Johnson ................... B60G 5/02 280/124.112 |
| 2018/0305126 A1 | 10/2018 | Moulin |

FOREIGN PATENT DOCUMENTS

| | | | |
|---|---|---|---|
| EP | 0501585 A1 * | 9/1992 | ............. B62D 21/14 |
| WO | WO-2017151691 A1 * | 9/2017 | ............... B60K 1/00 |

\* cited by examiner

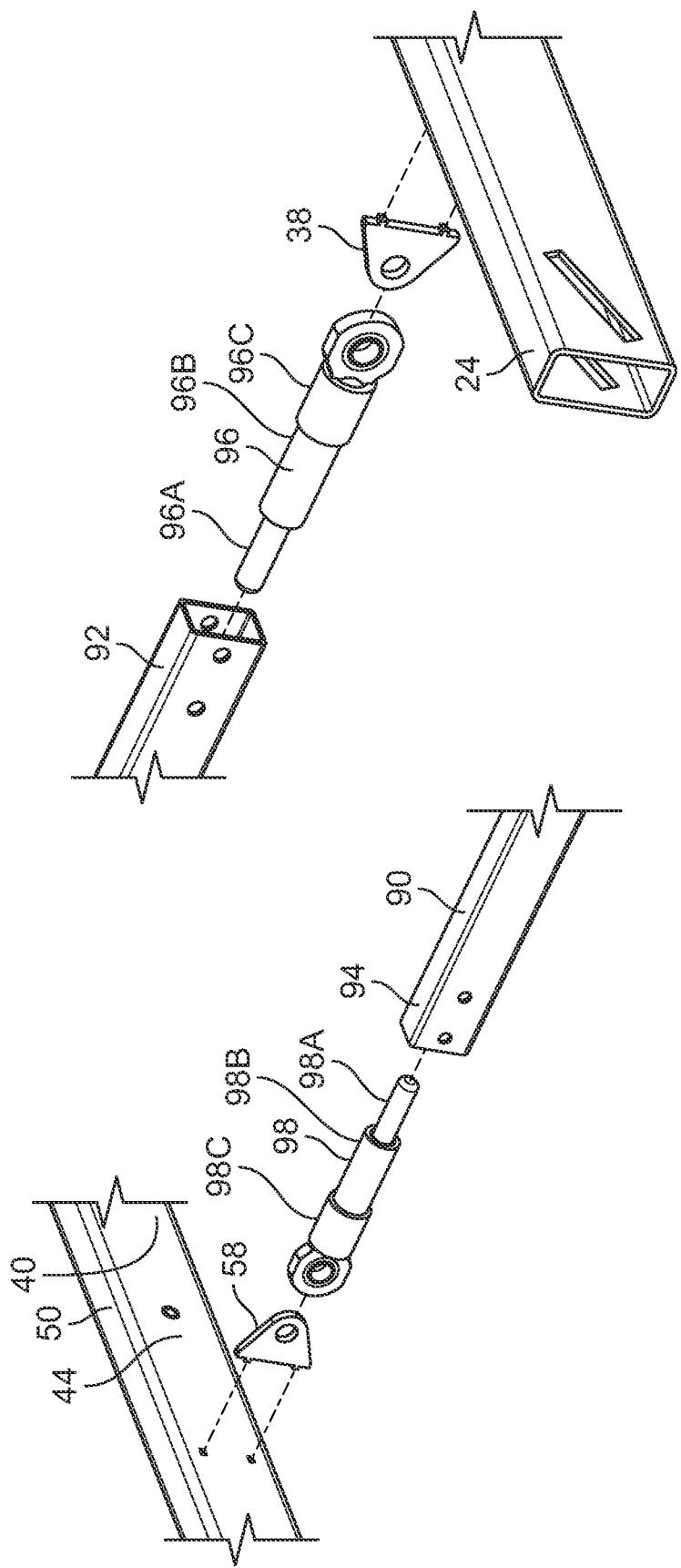

WALKING BEAM SUSPENSION

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a walking beam suspension for a vehicle or robot having a chassis, such as an autonomous agricultural vehicle or robot.

Related Art

Any discussion of the related art throughout the specification should in no way be considered as an admission that such related art is widely known or forms part of common general knowledge in the field.

Walking beam-type suspensions can be used in vehicles to reduce the transfer of disturbances from surface contacting elements, such as wheels and tires, to the vehicle chassis as the surface contacting elements encounter unevenness or deviations, e.g., ruts, holes, mounds, rocks, etc. in a surface, e.g., terrain or ground. By reducing the disturbances to the chassis, potential shifting and/or damage of a load supported by the chassis can be reduced. In some applications the load may comprise sensitive equipment, such as measuring equipment or scientific instruments. Reducing the disturbances that reach such equipment and instruments may enable them to produce better and more accurate measurements and/or other data, for example by reducing vibration, changes in orientation, etc.

Walking beam-type suspensions can be used on a variety of vehicles, ranging from multiple axle trailers to autonomous unmanned robots. One particularly complex example is the rocker-bogie suspension system used on various NASA unmanned robotic rovers, including Sojourner, Spirit, Opportunity, Curiosity and others.

Another particular application for a walking beam-type suspension is for autonomous agricultural robotic vehicles. A need for such vehicles has arisen out of the ever-increasing cost of manual labor, particularly in labor intensive operations such as cropping. The evolution of technology has made such vehicles feasible.

For example, in cropping operations, a tractor or other vehicle may pass over a row of a crop, sometimes multiple times. Over time, this results in the ground where the crop is present, i.e., the crop bed, having a substantially flat even surface, and the ground on either side of the crop where the tractor wheels have travelled developing a substantially compacted and uneven surface with wheel ruts, etc. When an autonomous vehicle is used to perform certain cropping operations, e.g., preparing or monitoring the crop bed, better performance can be obtained if disturbances transferred to the chassis of the vehicle from the ground contacts of the vehicle, e.g., wheels and/or tires, as they encounter uneven ground, e.g., wheel ruts, are reduced.

Some autonomous agricultural robotic vehicles either have no suspension, or have a suspension that cannot suitably react to the disturbances generated by surface contacting elements as they encounter unevenness or deviations and reduce the disturbances transferred to the chassis. Such vehicles produce inferior results. Other agricultural robotic vehicles have suspensions that are mechanically heavy, cumbersome, and/or complex. Such characteristics are undesirable from both power consumption and maintenance perspectives. Still other agricultural robotic vehicles have suspensions that are electronically controlled. Such suspensions present an unnecessary drain on power and processing resources.

There is a need for a walking beam suspension for an autonomous agricultural robotic vehicle or other vehicle that is simple, that is cost effective, and that is effective in operation to reduce the impact of surface contacting elements encountering unevenness or deviations, e.g., wheel ruts, on a chassis of the vehicle and on any load, instrument, etc. that may be supported thereon. There is also a need for such a suspension that mechanically reduces the disturbances transferred to a chassis of such a vehicle due to surface contacting elements encountering unevenness or deviations without the need for complex, costly, and power intensive electronic controls. There is also a need for such a suspension that acts to reduce disturbances to a chassis of such a vehicle from each of a plurality of surface contacting elements individually and independently from other surface contacting elements. There is also a need for such a suspension that acts to simultaneously reduce disturbances to a chassis of such a vehicle in both vertical and lateral directions from each of a plurality of surface contacting elements encountering unevenness or deviations. There is also a need for such a suspension that is able to support a chassis of such a vehicle on a surface, e.g., terrain or ground, by itself and independently without the need for external chassis support from additional surface contacting elements.

SUMMARY

An example embodiment is directed to a walking beam suspension. The walking beam suspension includes a first walking beam that is adapted to be pivotably connected to a first side of a vehicle chassis and to have one or more first surface contacting elements connected, and a second walking beam that is adapted to be pivotably connected to a second side of the vehicle chassis and to have one or more second surface contacting elements connected. The first walking beam is separately pivotable in response to the one or more first surface contacting elements encountering a deviation in a surface to maintain each of the first surface contacting elements in contact with the surface, and the second walking beam is separately pivotable in response to the one or more second surface contacting elements encountering a deviation in the surface to maintain each of the second surface contacting elements in contact with the surface.

The walking beam suspension also includes a dynamic coupling that is connected to the first walking beam and to the second walking beam, and that is adapted to be connected to the chassis. The dynamic coupling is dynamically adjustable to reduce movement of the chassis due to the pivoting of the first and second walking beams in response to deviations in the surface.

According to one aspect of the example embodiment, the first walking beam, the second walking beam, and the dynamic coupling together are adapted to support the chassis suspended above the surface without an external surface contacting element.

According to another aspect, the dynamic coupling is dynamically adjustable by dynamically moving with respect to the first walking beam, the second walking beam, and the chassis to compensate for changes in the distance and angle between the first and second walking beams as the first and second walking beams pivot relative to the chassis and to each other.

According to another aspect, the dynamic coupling is connected to the first walking beam by a first dynamic connector and to the second walking beam by a second dynamic connector. The first and second dynamic connectors can comprise first and second dynamic telescopic connectors that are dynamically extendable and retractable.

According to another aspect, the dynamic coupling is adapted to be connected to the chassis by a third dynamic connector. The third dynamic connector can be dynamically pivotable and/or dynamically linearly movable with respect to the chassis.

According to another aspect, the dynamic coupling includes a lateral connector and a chassis connector. The lateral connector extends in a direction of a lateral axis of the vehicle between the first walking beam and the second walking beam, and has a first end portion connected to the first walking beam by a first dynamic connector and a second end portion connected to the second walking beam by a second dynamic connector. The chassis connector extends in a direction of a longitudinal axis of the vehicle between the lateral connector and the chassis, and has a first end portion adapted to be connected to the chassis and a second end portion connected to the lateral connector by a third dynamic connector. The first, second, and third dynamic connectors are dynamically adjustable to reduce movement of the chassis due to the pivoting of the first and second walking beams in response to deviations in the surface.

According to another aspect, the first and second dynamic connectors are dynamically adjustable by dynamically moving in the direction of the lateral axis of the vehicle with respect to the first and second walking beams to compensate for changes in the distance and angle between the first and second walking beams as they pivot relative to the chassis and to each other. The third dynamic connector is dynamically adjustable by dynamically pivoting and/or moving linearly with respect to the chassis about an axis that extends in the direction of the longitudinal axis of the vehicle also to compensate for changes in the distance and angle between the first and second walking beams as they pivot. The first and second dynamic connectors can include first and second dynamic telescopic connectors that are dynamically extendable and retractable between the first and second end portions of the lateral connector and the first and second walking beams.

There has thus been outlined, rather broadly, some of the embodiments of the walking beam suspension in order that the detailed description thereof may be better understood, and in order that the present contribution to the art may be better appreciated. There are additional embodiments of the walking beam suspension that will be described hereinafter and that will form the subject matter of the claims appended hereto. In this respect, before explaining at least one embodiment of the walking beam suspension in detail, it is to be understood that the walking beam suspension is not limited in its application to the details of construction or to the arrangements of the components set forth in the following description or illustrated in the drawings. The walking beam suspension is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments of the walking beam suspension will become more fully understood from the detailed description given herein below and the accompanying drawings, wherein like elements are represented by like reference characters, which are given by way of illustration only and thus are not limitative of the example embodiments herein.

FIG. 13B is an exploded view of the portion of the robotic vehicle illustrated in FIG. 13A.

DETAILED DESCRIPTION

Figure 1:
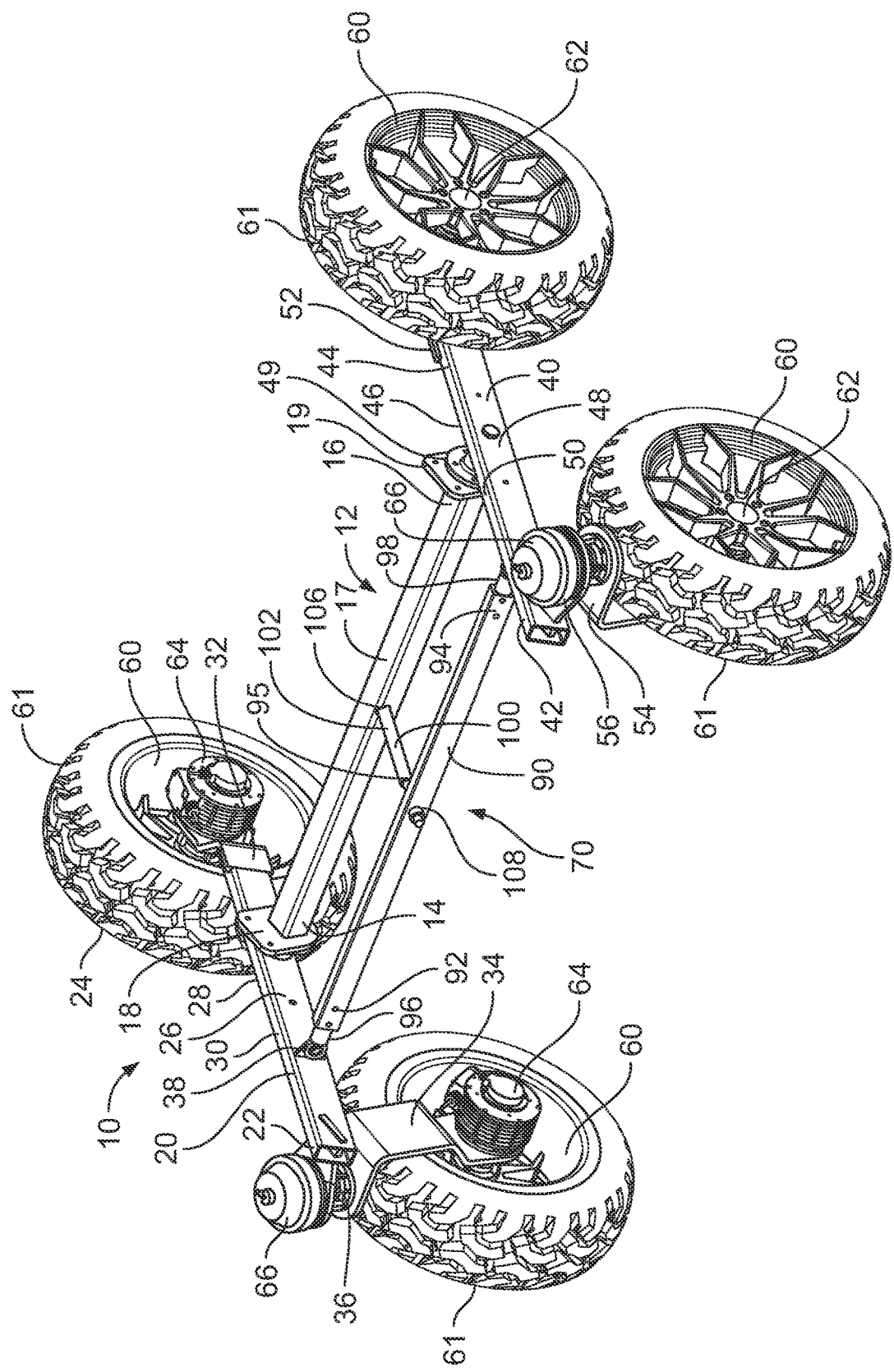
FIG. 1 is a top front perspective view of a robotic vehicle with a walking beam suspension in accordance with an example embodiment.
Figure 2:
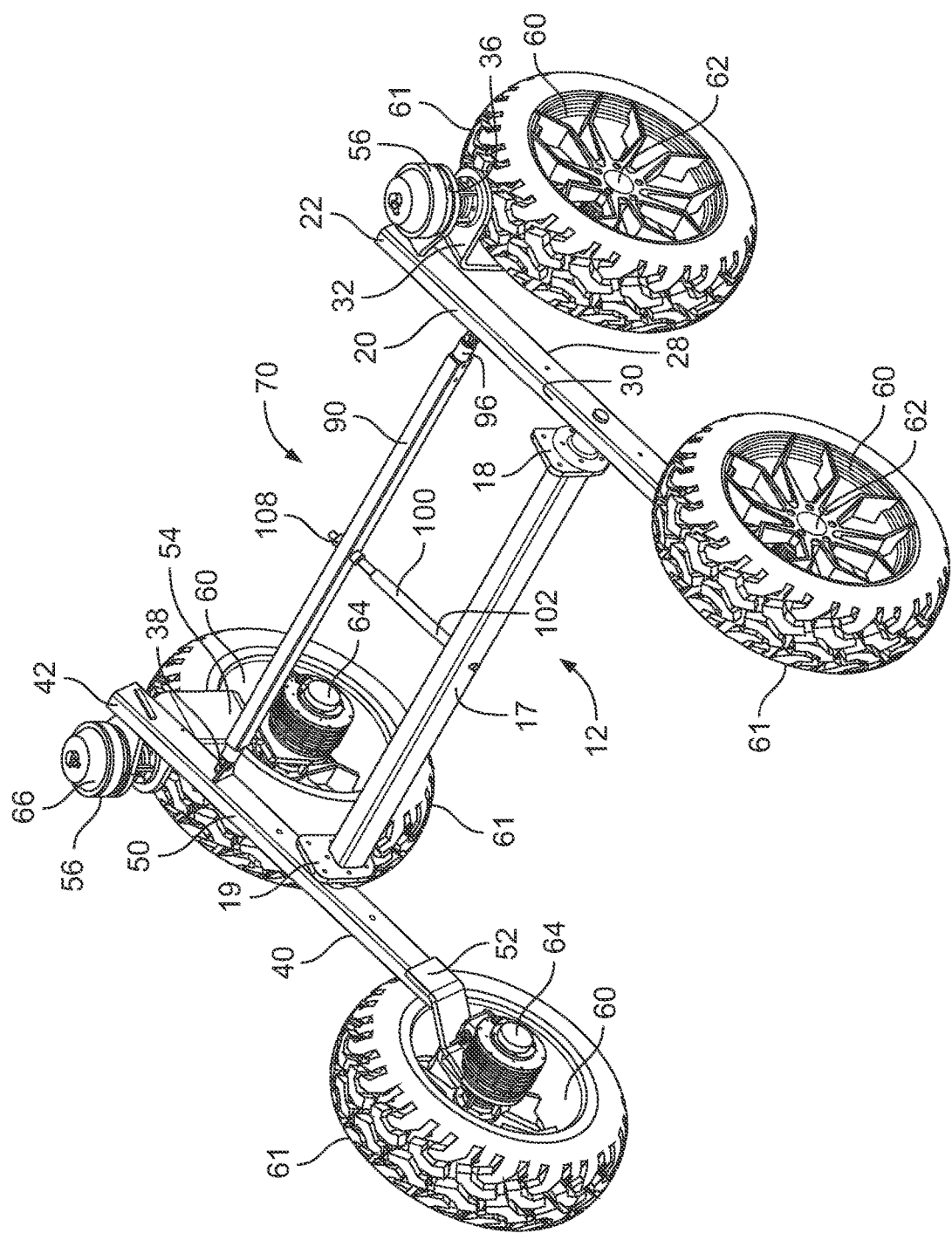
FIG. 2 is a top rear perspective view of a robotic vehicle with a walking beam suspension in accordance with an example embodiment.
Figure 3:
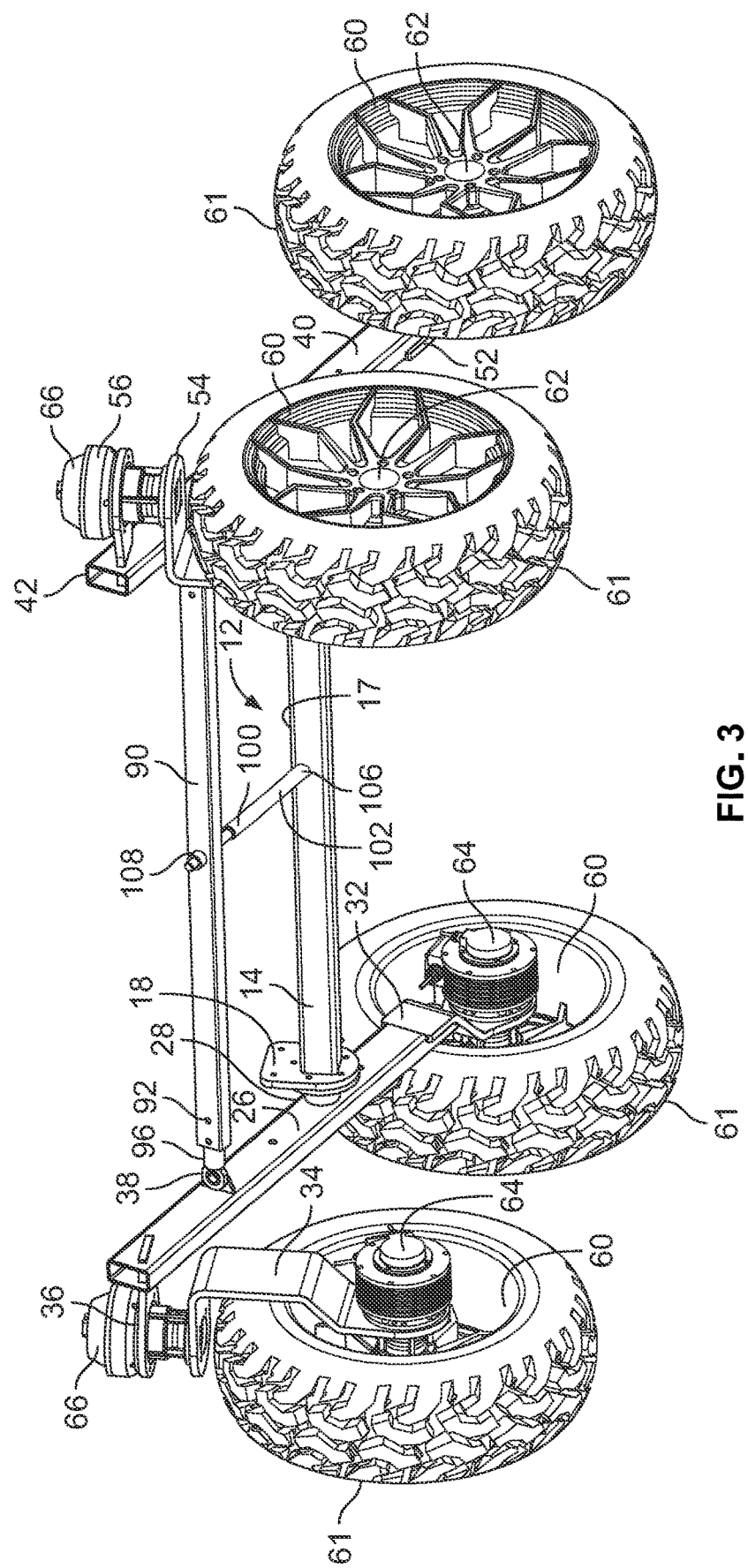
FIG. 3 is a bottom front perspective view of a robotic vehicle with a walking beam suspension in accordance with an example embodiment.
Figure 4:
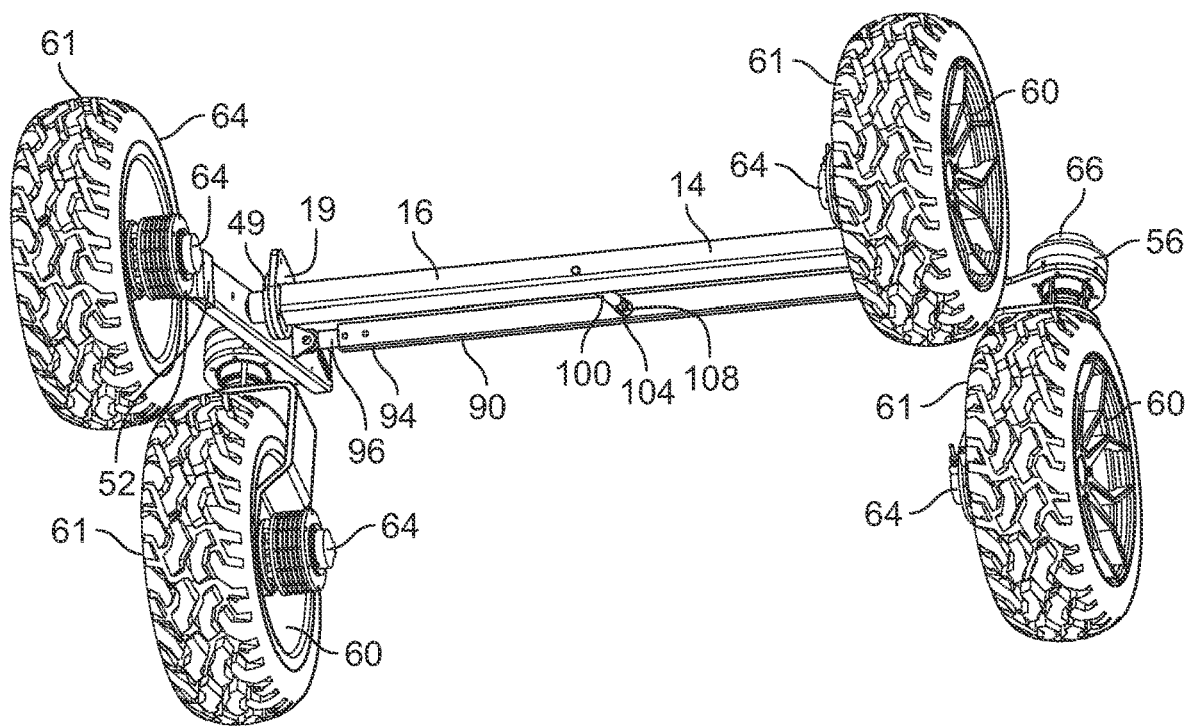
FIG. 4 is a bottom rear perspective view of a robotic vehicle with a walking beam suspension in accordance with an example embodiment.

The relative orientations and movements of the components and elements comprising an example embodiment of a walking beam suspension 10 for a vehicle can be described with reference to a coordinate system comprising three orthogonal axes: a longitudinal axis, a lateral axis, and a vertical axis. As referred to herein, the longitudinal axis comprises a longitudinal axis of the vehicle including the walking beam suspension 10 and extends through the center of gravity of the vehicle substantially in the direction of travel over a surface. The lateral axis extends laterally through the center of gravity substantially perpendicular to the longitudinal axis. The vertical axis extends vertically through the center of gravity substantially perpendicular to the longitudinal and lateral axes. When the vehicle is on a substantially flat horizontal surface, the longitudinal and lateral axes will be substantially horizontal and parallel with the surface, and the vertical surface will be substantially vertical and perpendicular to the surface.

A. Overview

An example walking beam suspension 10 is adapted to support the chassis 12 of a vehicle, e.g., an autonomous agricultural or other vehicle, on a plurality of movable surface contacting elements, e.g., wheels 60 and tires 61. The walking beam suspension 10 is adapted to support and suspend the chassis 12 above the surface independently and without the need for any additional external support from additional surface contacting elements.

The example walking beam suspension 10 operates mechanically and dynamically to maintain all of the surface contacting elements in contact with a surface, e.g., ground or terrain, as the vehicle traverses the surface and one or more of the surface contacting elements encounter surface deviations, e.g., depressions and elevations. The example walking beam suspension 10 also operates mechanically and dynamically to simultaneously reduce the transfer of movement or other disturbances to the chassis 12 and to any load that is supported thereon in response to the surface deviations.

The example walking beam suspension 10 generally includes a first walking beam 20, a second walking beam 40, and a dynamic coupling 70. The first walking beam 20 has a front end portion 22 connected to a front wheel and tire 60, 61 and a rear end portion 24 connected to a rear wheel and tire 60, 61. Similarly, the second walking beam 40 has a front end portion 42 connected to a front wheel and tire 60, 61 and a rear end portion 44 connected to a rear wheel and tire 60, 61. The wheels and tires 60, 61 comprise four independent and separate surface contacting elements and points of moving contact between the vehicle and the surface. The wheels and tires 60, 61 may be driven by drive motors 64. The two front wheels and tires 60, 61 may be selectively steerable with one or more steering motors 66.

The first walking beam 20 has a first pivot connector 29 with a first pivot axis and the second walking beam 40 has a second pivot connector 49 with a second pivot axis. The chassis 12 is pivotally connected between and is supported by the first and second walking beams 20, 40 with the first pivot connector 29 of the first walking beam 20 being pivotally connected to a first side of the chassis 12 and the second pivot connector 49 of the second walking beam 40 being pivotally connected to a second opposite side of the chassis 12. The first and second pivot axes extend substantially in the direction of the lateral axis of the vehicle and are substantially coaxial. The first walking beam 20 is pivotable about the first pivot axis in opposite first and second directions with respect to the chassis 12 separately and independently from the second walking beam 40, and the second walking beam 40 is pivotable about the second pivot axis in opposite first and second directions separately and independently from the first walking beam 20. The dynamic coupling 70 is located between and is connected to the first walking beam 20, the second walking beam 40, and the chassis 12 by dynamic movable connections. The dynamic coupling 70 is adapted and configured to extend and retract substantially along the lateral axis of the vehicle, pivot about a third pivot axis that extends substantially in the direction of the longitudinal axis of the vehicle, and simultaneously move linearly forward and backward along the third pivot axis relative to the chassis 12 and the first and second walking beams 20, 40 as the first and second walking beams 20, 40 pivot about the first and second pivot axes relative to each other and the chassis 12.

The dynamic coupling 70 comprises a lateral connector 90 and a chassis connector 100. The lateral connector 90 extends substantially in the direction of the lateral axis of the vehicle between the first and second walking beams 20, 40. The lateral connector 90 has a first end portion 92 that is connected to the first walking beam 20 and an opposite second end portion 94 that is connected to the second walking beam 40. By providing a lateral connection between the first and second walking beams 20, 40 and a connection to the chassis 12 the dynamic coupling 70 enables the walking beam suspension 10 to support and suspend the chassis 12 of the vehicle on the walking beams 20, 40 and the connected wheels and tires 60, 61 above the surface on its own and without any additional ground contacting elements being required.

The connections between the first and second end portions 92, 94 of the lateral connector 90 and the first and second walking beams 20, 40 respectively comprise movable dynamic connections. Accordingly, the first end portion 92 of the lateral connector 90 comprises a first telescopic connector 96 and the opposite second end portion 94 has a second telescopic connector 98. The first and second telescopic connectors 96, 98 are adapted to extend and retract inwardly and outwardly relative to the lateral connector 90 and the first and second walking beams 20, 40 substantially in the direction of the lateral axis of the vehicle as the first and second walking beams 20, 40 pivot about the first and second pivot axes relative to each other and the chassis 12.

The chassis connector 100 extends in the direction of the longitudinal axis of the vehicle between the lateral connector 90 and the chassis 12. The chassis connector 100 has a first end portion 102 with a fixed first connection 106 to the chassis 12 preferably at or near its mid-point and an opposite second end portion 104 with a second connection 108 to the lateral connector 90 preferably at or near its mid-point. The second connection 108 comprises a movable dynamic connection. The movable dynamic connection comprises a connector that is simultaneously pivotable on the chassis connector 100 about a third pivot axis that corresponds to the longitudinal axis of the chassis connector 100 and linearly movable on the chassis connector 100 along the third pivot axis. The movable dynamic second connection 108 enables the lateral connector 90 to simultaneously pivot about and move linearly along the third pivot axis as the first and second walking beams 20, 40 pivot about the first and second pivot axes relative to each other and the chassis 12.

As a vehicle with the walking beam suspension 10 traverses a surface, one or more of the wheels and tires 60, 61 on the first side of the chassis 12 may encounter surface deviations. In response, the first walking beam 20 pivots about the first pivot axis in the first and second directions (depending on the deviation) to maintain both of the wheels and tires 60, 61 on the first side of the chassis 12 in contact with the surface. Similarly, as one or more of the wheels and tires 60, 61 on the second side of the chassis 12 encounter surface deviations, the second walking beam 40 separately and independently pivots about the second pivot axis in the first and second directions to maintain both of the wheels and tires 60, 61 on the second side of the chassis 12 in contact with the surface.

However, as the first and second walking beams 20, 40 pivot relative to each other the distance and angle between directly opposite points on the first and second walking beams 20, 40 change. This includes the connection points to the first and second end portions 92, 94 of the lateral connector 90 of the dynamic coupling 70. A static rigid lateral connection between the first and second walking beams and between the lateral connection and the chassis 12 would transfer these changes to the chassis 12 and to any load elements supported thereon directly and unabated as changes in elevation and orientation.

In contrast, the dynamic coupling 70 dynamically adjusts and compensates for any changes in distance and angle between the first and second walking beams 20, 40. As the first and second walking beams 20, 40 pivot relative to each other, the first and second telescopic connectors 96, 98 at the opposite first and second end portions of the lateral connector 90 extend or retract (depending on the direction of relative pivoting of the first and second walking beams 20, 40) in the direction of the lateral axis of the vehicle. Simultaneously the lateral connector 90 pivots on and moves linearly forward and backward on the chassis connector 100 about an axis that extends substantially in the direction of the longitudinal axis of the vehicle. In this manner the movable dynamic connections provided by the dynamic coupling 70 compensate for the changes in distance and angle and reduce the transfer of any movements and disturbances caused by the surface deviations to the chassis 12.

B. Chassis

The example walking beam suspension 10 is adapted to support a chassis 12 of a vehicle, e.g., an autonomous agricultural vehicle or other vehicle, on and between the first and second walking beams 20, 40 as best illustrated in FIGS. 1-12 and as described further below. The chassis 12 in turn is preferably adapted to support a load, which may include for example a variety of tools, equipment, instruments, devices, self-contained power sources, transmitters, receivers, electronics, video and/or still cameras, lighting, etc. For example, the chassis 12 may support various tools or equipment useful in cropping such as plows, tillers, harrows, seeders, spreaders, etc. Also for example, the chassis 12 may support one or more wireless transceivers, controllers, processors, logic circuits, etc. to wirelessly receive remote control signals to control the operation of various tools, equipment, and devices on the chassis 12, control steering and drive motors to motivate and direct the vehicle, and sense and wirelessly transmit data related to crops, weather, moisture, etc. to a remote data receiver. The chassis 12 is preferably constructed of a light-weight rigid material, such as a light-weight metal, that is sufficiently strong to support the load without deformation or damage.

The items comprising the load may be directly or indirectly mounted or connected to the chassis 12. For example, a platform, frame or container may be mounted to and supported on the chassis 12 and the items comprising the load may be mounted to or may be contained on or in the platform, frame, or container. As described herein, the walking beam suspension 10 is operative to mechanically and dynamically reduce the movement and other disturbances that are transferred to the chassis 12 and through the chassis 12 to the load supported thereon as the vehicle traverses an uneven surface.

In the example embodiment best illustrated in FIGS. 1-12, the chassis 12 is represented as an elongated substantially linear beam or bar with a first end portion or first side portion 14, a second end portion or second side portion 16 opposite of the first end or side portion 14, and a top surface 17. It is noted that whether the opposite ends or sides of the chassis 12 are denominated as "ends" or "sides" may depend on the relative length and width dimensions of the vehicle and the chassis 12. However, whichever term is used does not limit the example embodiments described herein and has no impact on understanding the features of the example embodiments described herein. Thus, the term "side" will be used hereinafter and is intended to encompass "end." The first side portion 14 preferably includes a first side connector 18 that is adapted to pivotally connect the first side portion 14 to the first walking beam 20. Similarly, the second side portion 16 preferably includes a second side connector 19 that is adapted to pivotally connect the second side portion 16 to the second walking beam 40. The chassis 12 is thus pivotally supported on and between the first and second walking beams 20, 40 with a first side of the chassis 12 pivotally connected to the first walking beam 20 and a second side of the chassis 12 opposite of the first side pivotally connected to second walking beam 40.

The first and second side connectors 18, 19 enable the first and second walking beams 20, 40 on the first and second sides of the chassis 12 respectively to separately and independently pivot relative to each other and to the chassis 12 about pivot axes that extend substantially in the direction of the lateral axis of the vehicle. Thus, the first and second walking beams 20, 40 are able to separately and independently pivot substantially in the direction of the vertical axis of the vehicle, i.e., upwardly and downwardly, as the vehicle traverses a surface and encounters surface deviations. The walking beam suspension 10 is thus able to maintain all the surface contacting elements, e.g. wheels and tires 60, 61 on each side of the chassis 12 in contact with the surface and to reduce the transfer to the chassis 12 of movement or disturbances due to the surface deviations.

The first and second side connectors 18, 19 each may comprise any type of connector that is suitable to pivotally connect with the first and second pivot connectors 29, 49 of the first and second walking beams 20, 40 respectively, which are described further below. For example, the first and second side connectors 18, 19 may each comprise a flange fixed to the first or second side portion 14, 16 of the chassis 12 with an opening adapted to receive and pivotally retain a pivotable portion of the first or second pivot connector 29, 49 respectively.

The items comprising the load may be connected or attached to and supported directly on the top surface 17 or elsewhere on the chassis 12. Similar, a platform, frame, container, etc. may be connected or attached to and supported on the top surface 17 or elsewhere on the chassis 12.

The chassis 12 is supported and suspended above and in movable contact with the surface by the first and second walking beams 20, 40, by the plurality of movable surface contacting elements, e.g., wheels and tires 60, 61 connected to the first and second walking beams 20, 40, which are described further below, and by a dynamic coupling 70 between the first and second walking beams 20, 40 and the chassis 12, which is also described in detail below. As will become clear from the description herein, no other surface contacting elements, e.g., additional axle and wheels, tow hitches, etc. are necessary to maintain the chassis 12 supported and suspended above the surface and to prevent it from pivoting into contact with the surface.

While the chassis 12 is illustrated in FIGS. 1-12 as an elongated linear member, that is merely one example configuration of the chassis 12. It is contemplated and will be appreciated that the chassis 12 may have numerous other and different configurations that are consistent with the objectives and functionality of the example embodiments as described herein. As additional examples, the chassis 12 may comprise an elongated non-linear member, or a plurality of elongated interconnected linear and/or non-linear members. The chassis 12 also may comprise a multi-member or monolithic closed or open frame structure. The frame structure may have numerous shapes including square, rectangular, and other geometric shapes. The frame may be substantially planar or may be three dimensional. The chassis 12 also may comprise a partially or wholly solid structure and the structure may have various shapes in either two or three dimensions. All such variations and others that are consistent with the purposes and functions of the chassis 12 as described herein are intended to be included.

C. First and Second Walking Beams

As best illustrated in FIGS. 1-12, the example embodiment of the walking beam suspension 10 comprises a first walking beam 20 and a second walking beam 40. As described above, the first walking beam 20 is pivotally connected to a first side of the chassis 12 and the second walking beam 40 is pivotally connected to the second side of the chassis 12 opposite of the first side. Preferably the first and second walking beams 20, 40 each extend in the direction of the longitudinal axis of the vehicle, are substantially parallel with each other, and are directly opposite each other on the opposite sides of the chassis 12. Also preferably each of the first and second walking beams 20, 40 is constructed of a light-weight rigid material, such as a light-weight metal, that is sufficiently strong to support the chassis 12 and the load thereon without deformation or damage.

In the example embodiment, the first and second walking beams 20, 40 are represented as substantially identical elongated substantially linear beams. However, that is merely one example configuration of the first and second walking beams 20, 40. It is contemplated and will be appreciated that the first and second walking beams 20, 40 each may have many different configurations that are consistent with the objectives and functionality of the example embodiments described herein. As additional examples each of the first and second walking beams 20, 40 may comprise an elongated non-linear member or a plurality of elongated interconnected linear and/or non-linear members. Each of the first and second walking beams 20, 40 also may comprise a multi-member or monolithic closed or open frame structure, and the frame structure may have numerous geometric shapes and may be substantially planar or may be three dimensional. Each of the first and second walking beams 20, 40 also may comprise a partially or wholly solid structure and the structure may have numerous different geometric shapes in either two or three dimensions. Further, the first and second walking beams 20, 40 need not be the same. All such variations and others that are consistent with the objectives and functionality of the example embodiment as described herein are intended to be included.

The first walking beam 20 has a front end portion 22 rotatably connected to a front wheel and tire 60, 61 in a manner described below, a rear end portion 24 opposite of the front end portion 22 and connected to a rear wheel and tire 60, 61 also in a manner described below, a first side 26 facing the chassis 12 and the second walking beam 40, a second side 28 opposite of and facing away from the first side 26, and a top surface 30. Similarly, the second walking beam 40 has a front end portion 42 connected to a front wheel and tire 60, 61 in a manner described below, a rear end portion 44 opposite of the front end portion 42 connected to a rear wheel and tire 60, 61 also in a manner described below, a first side 46 facing the chassis 12 and the first walking beam 20, a second side 48 opposite of and facing away from the second side 46, and a top surface 50.

1. First and Second Pivot Connectors and Pivot Axes.

The first walking beam 20 also has a first pivot connector 29 with a first pivot axis and the second walking beam 40 has a second pivot connector 49 with a second pivot axis. The first pivot connector 29 of the first walking beam 20 is pivotally connected to the first side connector 18 on the first side portion 14 of the chassis 12. The second pivot connector 49 of the second walking beam 40 is pivotally connected to the second side connector 19 on the second opposite side portion of the chassis 12. The chassis 12 is thus pivotally connected between and is supported by the first and second walking beams 20, 40 on its opposite first and second side portions 14, 16. Each of the first and second pivot connectors 29, 49 may comprise a freely rotatable hub set and/or axle structure, such as are often used on trailers and the like, and which are commercially available.

The first and second pivot connectors 29, 49 are preferably located on the first and second walking beams 20, 40 directly opposite each other on the respective first and second side portions 14, 16 of the chassis 12. As best illustrated in FIGS. 1-10, each of first and second pivot connectors 29, 49 is preferably located on the respective first and second walking beam 20, 40 at a point approximately mid-way between the axes of rotation of the respective front and rear wheel and tire 60, 61 connected to the respective walking beam 20, 40. The first and second pivot axes of the respective first and second pivot connectors 29, 49 each extend substantially in the direction of the lateral axis of the vehicle and substantially perpendicular with respect to the longitudinal axis of the vehicle and the first and second walking beams 20, 40. Preferably, the first and second pivot axes are substantially coaxial.

As noted, the first walking beam 20 and the wheels and tires 60, 61 connected thereto extend in the direction of the longitudinal axis of the vehicle on the first side portion 14 of the chassis 12. The first walking beam 20 and connected wheels and tires 60, 61 are pivotable about the first pivot axis upward and downward in the direction of the vertical axis of the vehicle with respect to the chassis 12 separately and independently from the second walking beam 40. Similarly, the second walking beam 40 and the wheels and tires 60, 61 connected thereto extend in the direction of the longitudinal axis of the vehicle on the second side portion 16 of the chassis 12. Also similarly, the second walking beam 40 and connected wheels and tires 60, 61 are pivotable about the second pivot axis upward and downward in the direction of the vertical axis of the vehicle with respect to the chassis 12 separately and independently from the first walking beam 20.

From the foregoing, it will be appreciated that as the vehicle traverses a surface, one or more of the front and rear wheels and tires 60, 61 connected to the first walking beam 20 on the first side portion 14 of the chassis 12 may encounter surface deviations, e.g., elevations and depressions. The front and rear wheels and tires 60, 61 also may assume different elevations, for example in the case of an upwardly or downwardly sloped surface. In response, the first walking beam 20 pivots about the first pivot axis in a direction to maintain each of the connected front and rear wheel and tire 60, 61 in contact with the surface. The pivoting of the first walking beam 20 also reduces the transfer of any movements and other disturbances due to the surface deviations to the first side 14 of the chassis 12. Because the first walking beam 20 is pivotable about the first pivot axis separately and independently of the second walking beam 40, the first walking beam 20 is able to maintain the wheels and tires 60, 61 on the first side of the chassis 12 in contact with the surface and to reduce the transfer of movements and disturbances to the chassis 12 separately and independently of the second walking beam 40.

Similarly, it will be appreciated that as the vehicle traverses a surface, one or more of the front and rear wheels and tires 60, 61 connected to the second walking beam 40 on the second side portion 16 of the chassis 12 may also encounter surface deviations and may assume different elevations. In the same way as described with respect to the first walking beam 20, the second walking beam 40 responds by pivoting about the second pivot axis in a direction to maintain both the front and rear wheel and tire 60, 61 in contact with the surface and to reduce the transfer of any movements and other disturbances due to the deviations to the second side or end portion 16 of the chassis 12. Because the second walking beam 20 is pivotable about the second pivot axis separately and independently of the first walking beam 20, the second walking beam 40 is able to maintain the front and rear wheels 60, 61 in contact with the surface and to reduce the transfer of movements and disturbances to the chassis 12 separately and independently of the first walking beam 20.

Figure 15A:
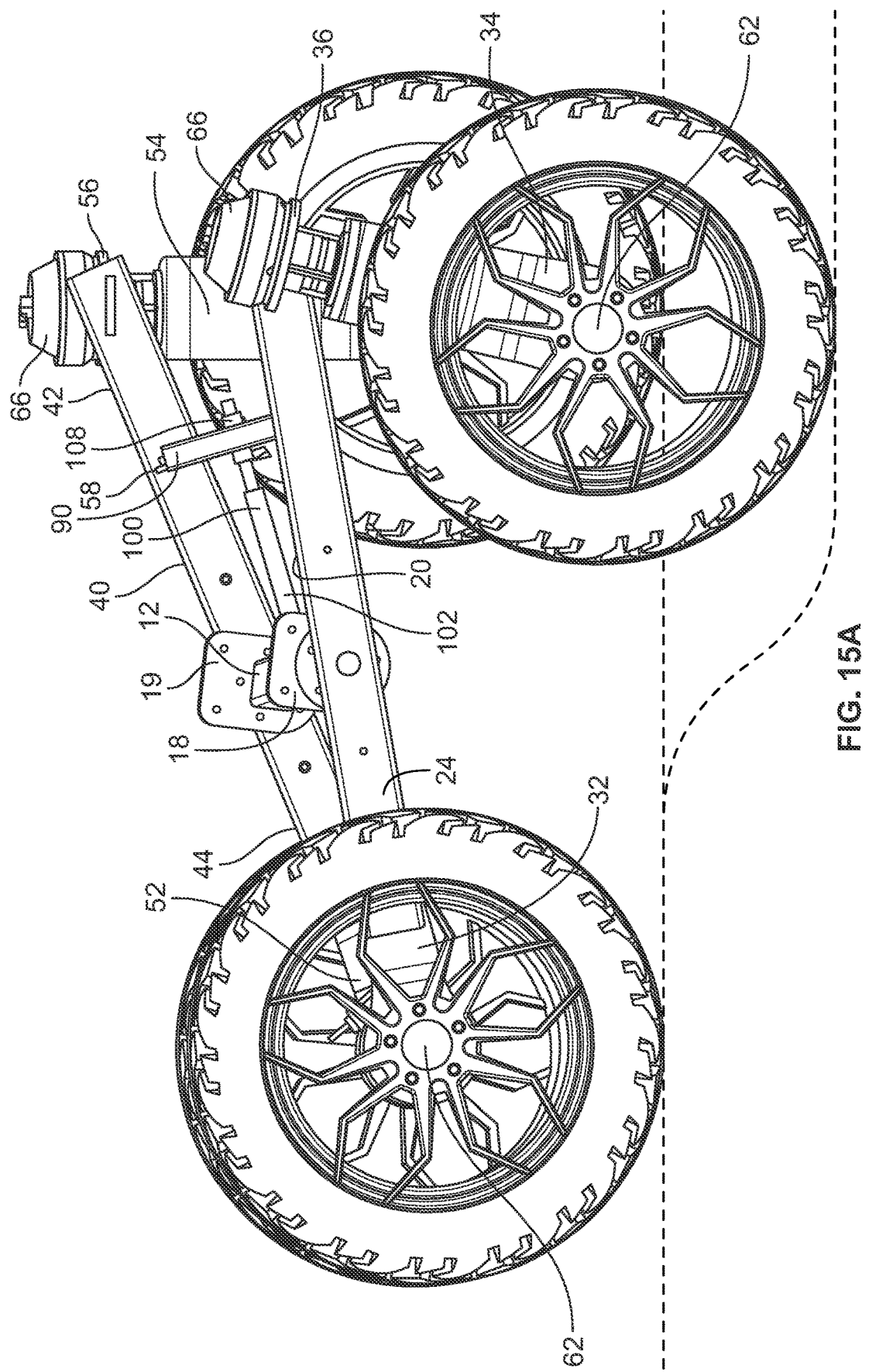
FIG. 15A is a side view of a robotic vehicle with a walking beam suspension in accordance with an example embodiment illustrating the reaction of the suspension to a front wheel on a first side of the vehicle encountering a surface depression.
Figure 15B:
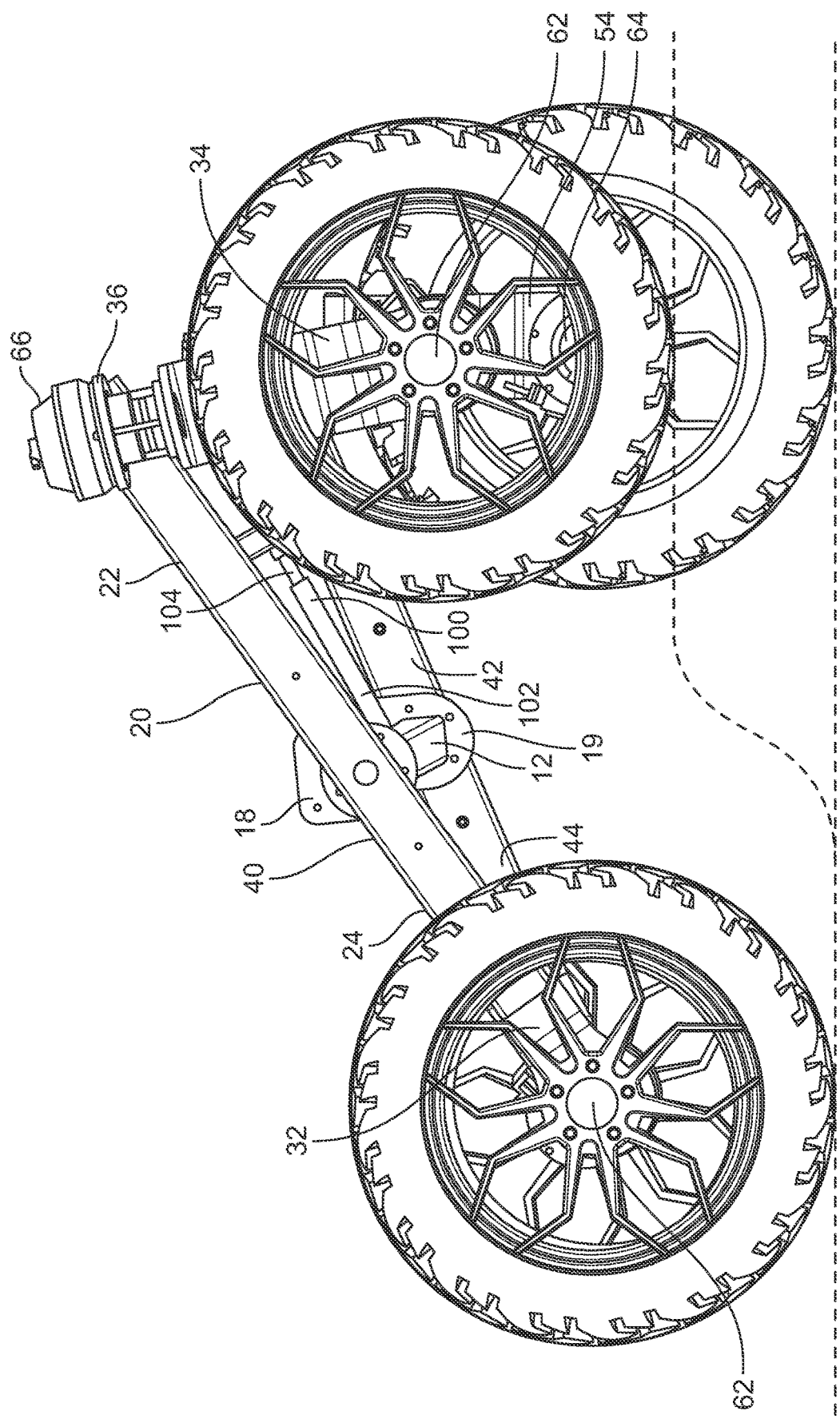
FIG. 15B is a side view of a robotic vehicle with a walking beam suspension in accordance with an example embodiment illustrating the reaction of the suspension to a front wheel on a first side of the vehicle encountering a surface elevation.
Figure 15C:
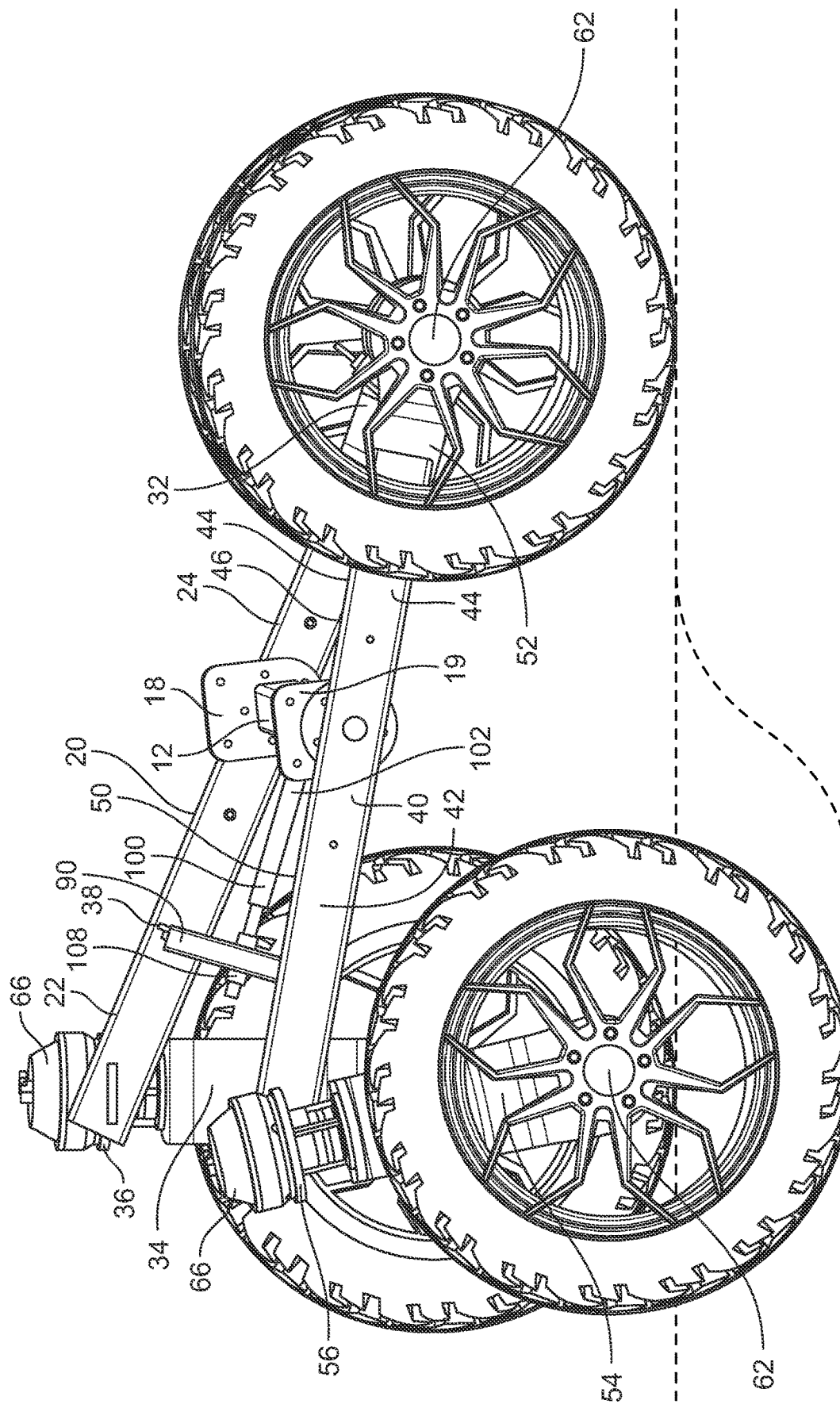
FIG. 15C is a side view of a robotic vehicle with a walking beam suspension in accordance with an example embodiment illustrating the reaction of the suspension to a front wheel on a second side of the vehicle encountering a surface depression.
Figure 15D:
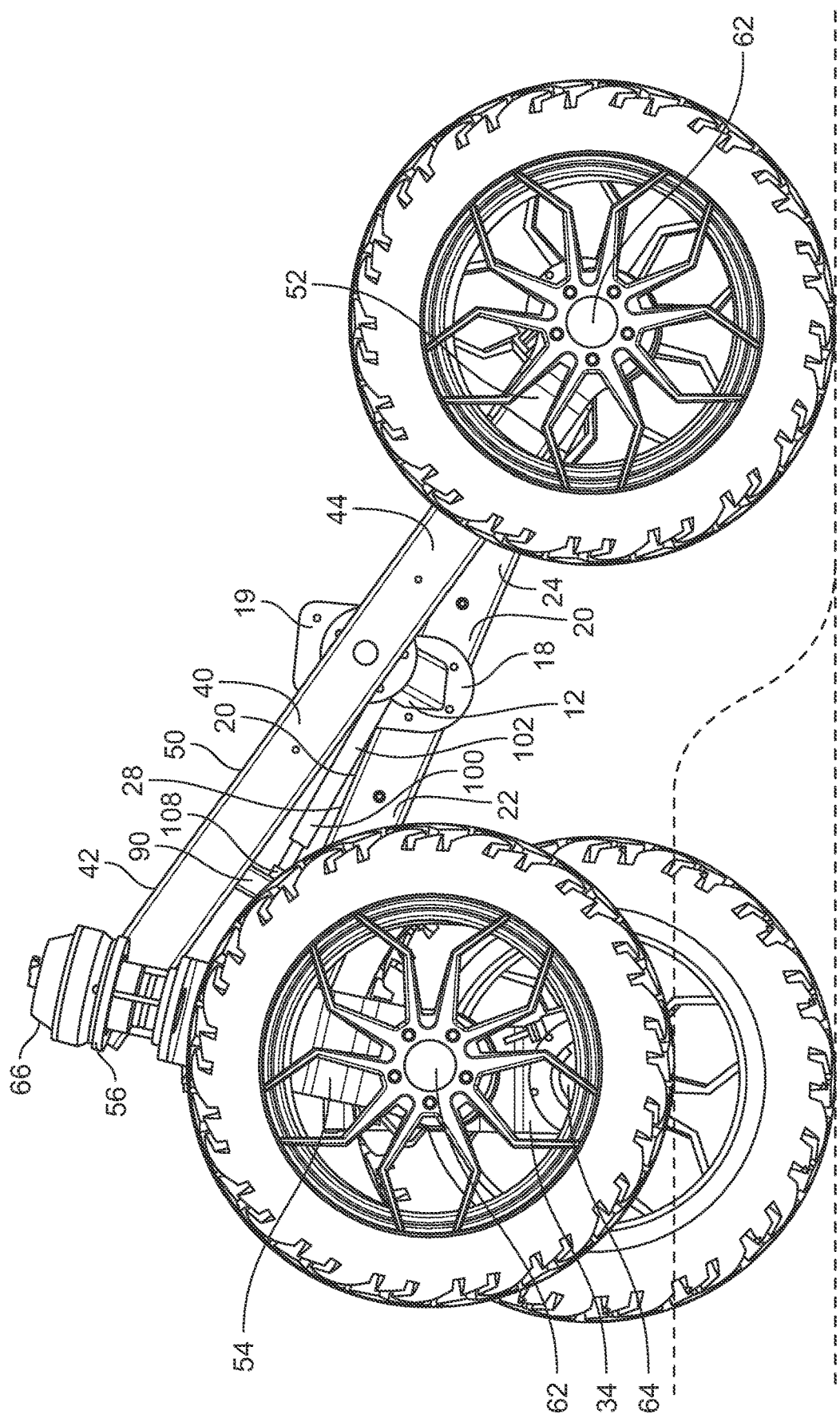
FIG. 15D is a side view of a robotic vehicle with a walking beam suspension in accordance with an example embodiment illustrating the reaction of the suspension to a front wheel on a second side of the vehicle encountering a surface elevation.
Figure 15E:
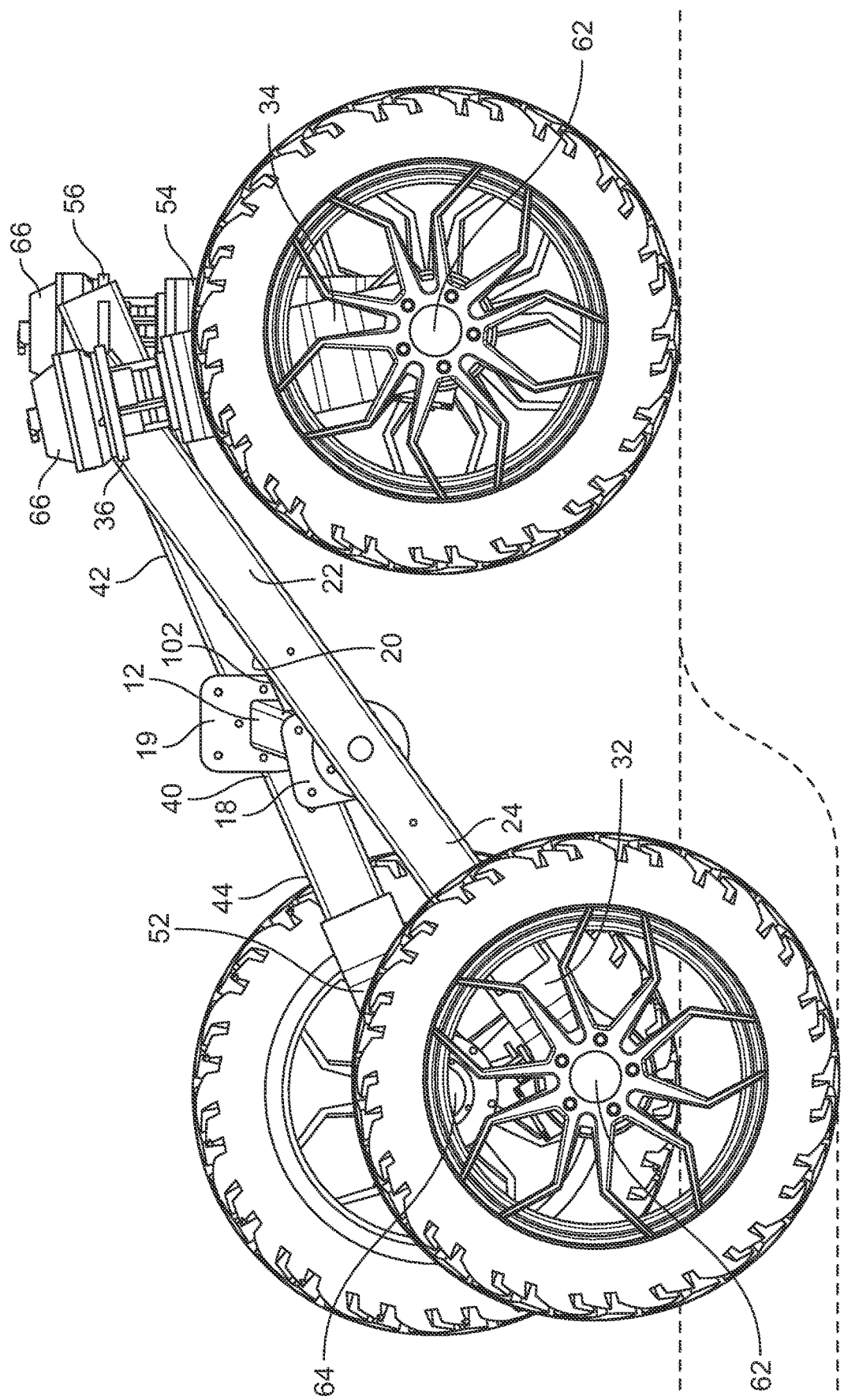
FIG. 15E is a side view of a robotic vehicle with a walking beam suspension in accordance with an example embodiment illustrating the reaction of the suspension to rear wheel on a first side of the vehicle encountering a surface depression.
Figure 15F:
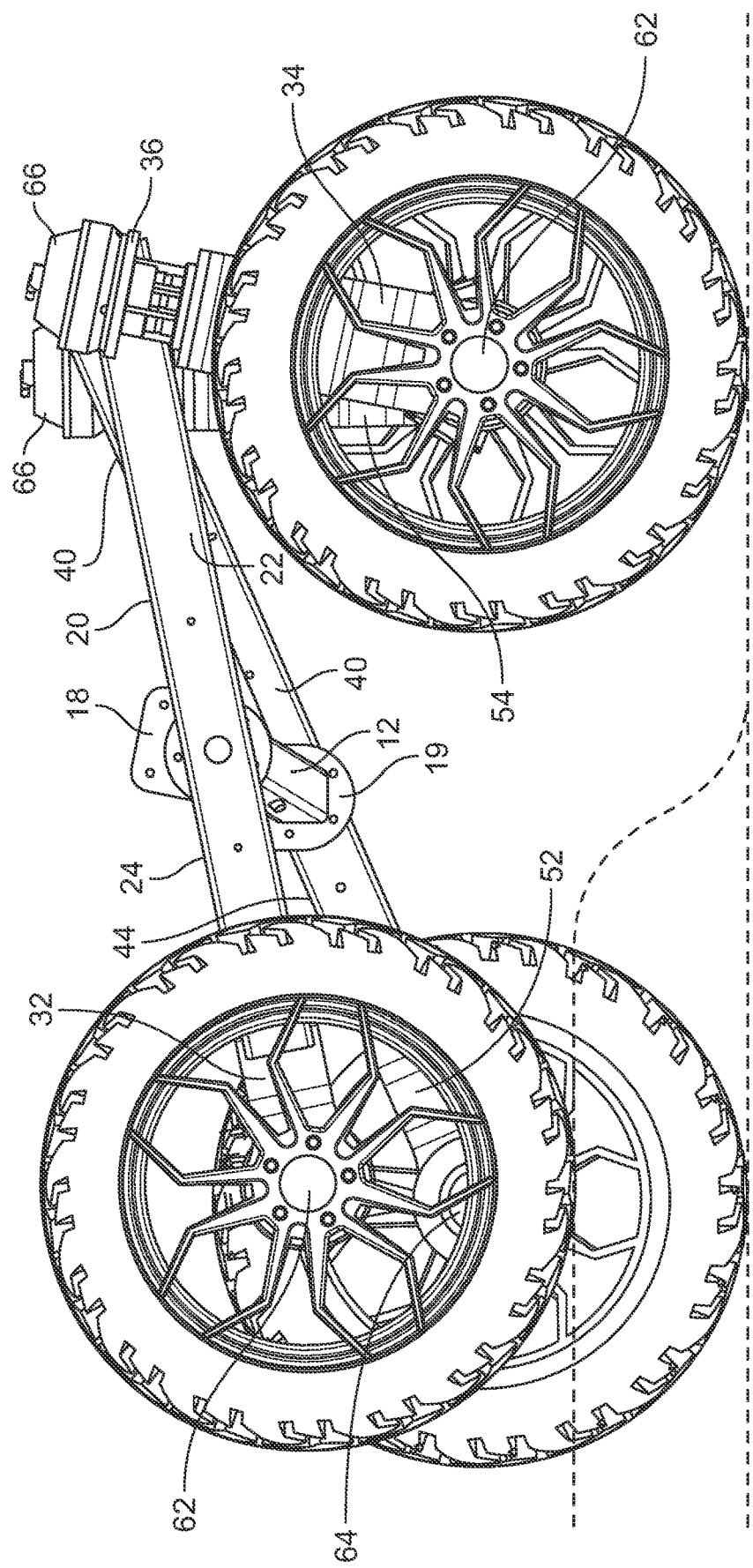
FIG. 15F is a side view of a robotic vehicle with a walking beam suspension in accordance with an example embodiment illustrating the reaction of the suspension to a rear wheel on a first side of the vehicle encountering a surface elevation.
Figure 15G:
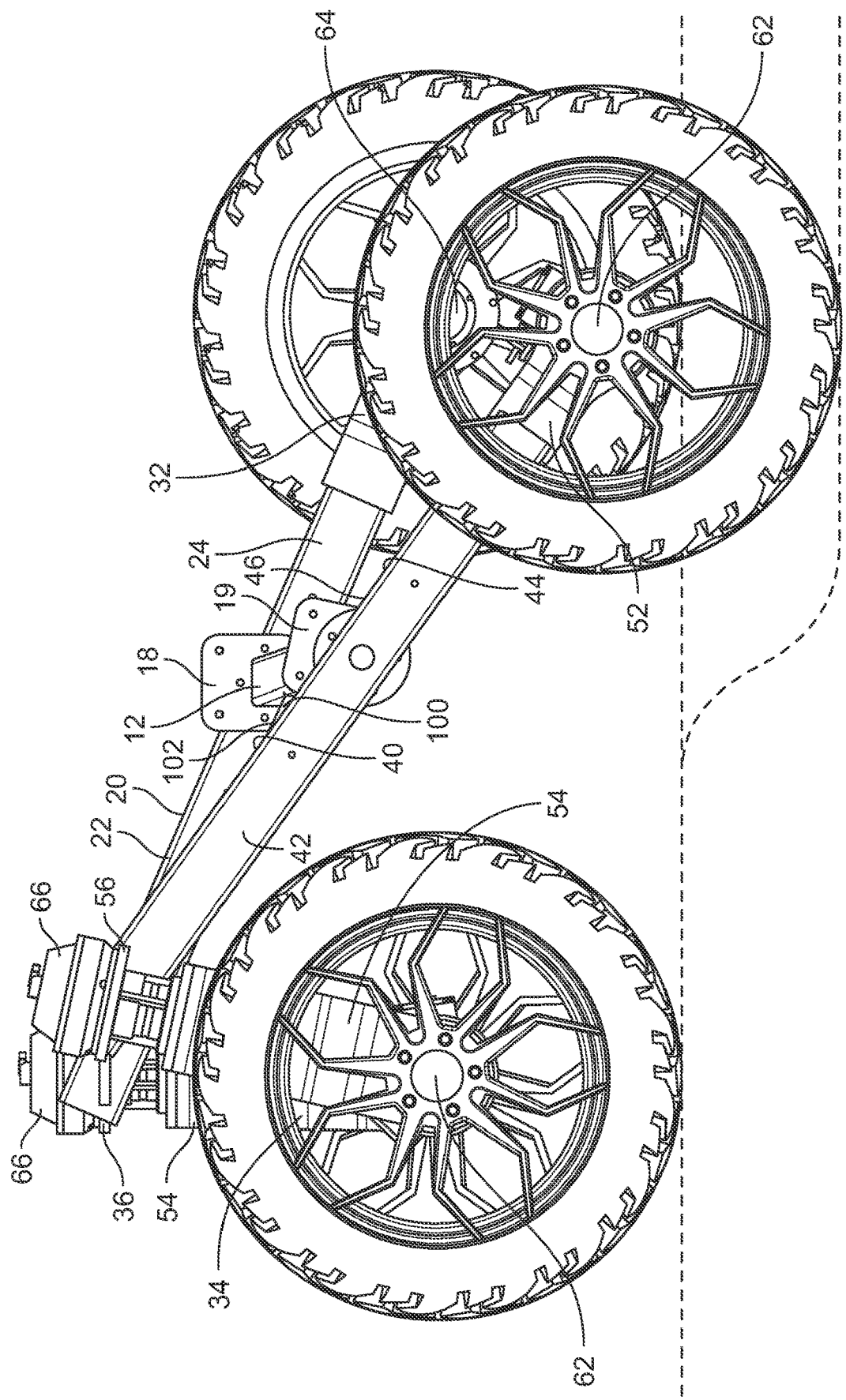
FIG. 15G is a side perspective view of a robotic vehicle with a walking beam suspension in accordance with an example embodiment illustrating the reaction of the suspension to a rear wheel on a second side of the vehicle encountering a surface depression.
Figure 15H:
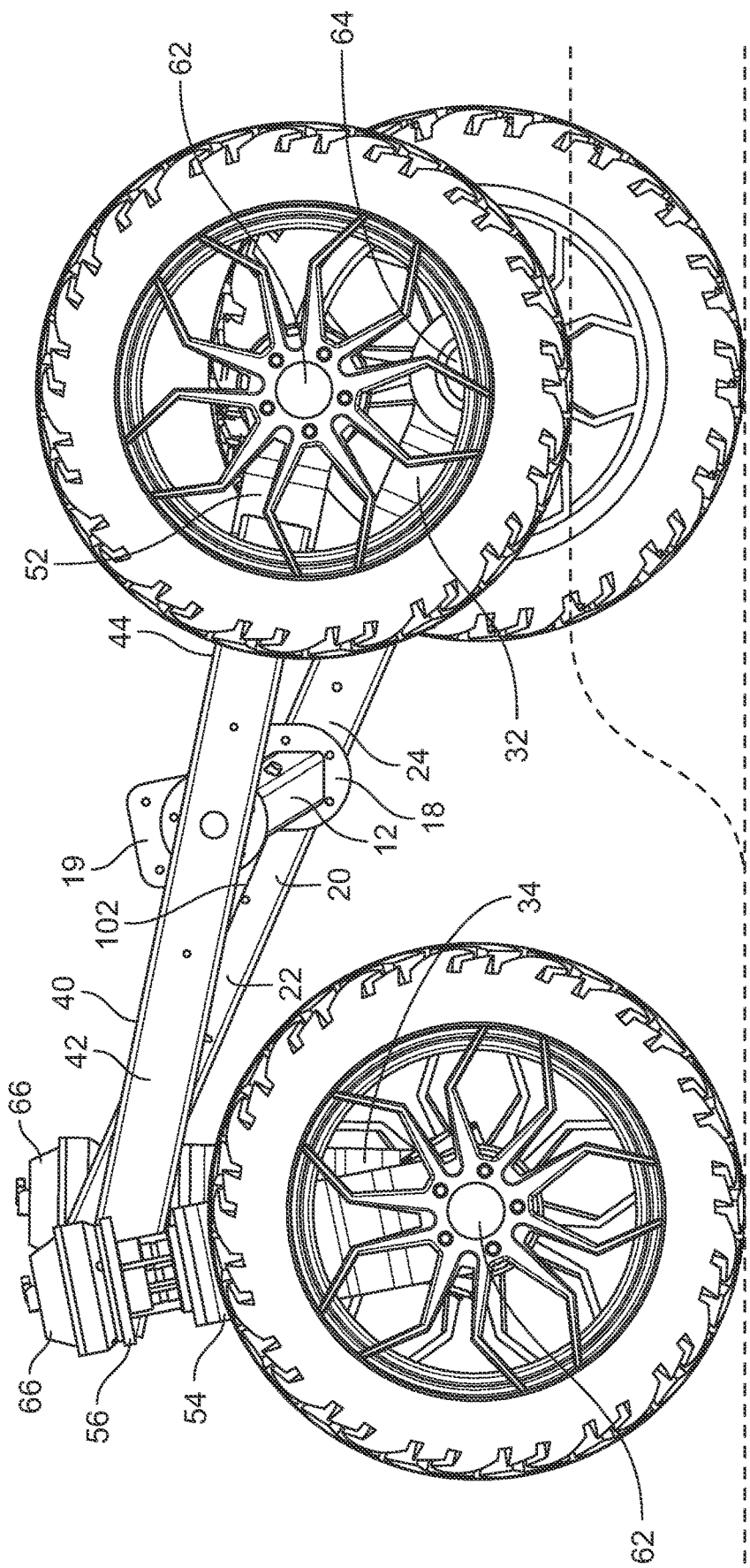
FIG. 15H is a side view of a robotic vehicle with a walking beam suspension in accordance with an example embodiment illustrating the reaction of the suspension to a rear wheel on a second side of the vehicle encountering a surface elevation.

FIGS. 15A-15H and 16A-16H illustrate graphically the response of each of the first and second walking beams 20, 40 to each of the front and rear wheels and tires 60, 61 on each of the first and second sides 14, 16 of the chassis 12 individually encountering a deviation in a surface the vehicle is traversing. For example as shown in FIG. 15A, when the front wheel and tire 60, 61 on the first end 14 of the chassis 12 encounters a depression or decline in the surface, the first walking beam 20 responds by pivoting about the first pivot axis in a first direction to maintain both the front and rear wheels and tires 60, 61 in contact with the surface. Similarly as shown in FIG. 15B, when the front wheel and tire 60, 61 on the first side or end 14 of the chassis 12 encounters an elevation or incline in the surface, the first walking beam 20 responds by pivoting about the first pivot axis in a second direction opposite to the first direction to maintain the front and rear wheels and tires 60, 61 in contact with the surface. As similarly illustrated in FIGS. 15C-15H, the first and second walking beams 20, 40 each separately and independently pivot about the first and second pivot axes respectively in the first and second directions as each of their connected front and rear wheels 60, 61 encounter upward and downward deviations in the surface to separately and independently maintain their respective front and rear wheels and tires 60, 61 in contact with the surface.

Although FIGS. 15A-15H and 16A-16H illustrate for exemplary purposes the effect of each individual wheel and tire 60, 61 of a vehicle encountering a surface deviation, it will be appreciated that as the vehicle traverses a surface, one or more of the wheels and tires 60, 61 on either or both of the first and second sides 14, 16 of the chassis 12 are likely to encounter surface deviations simultaneously and/or sequentially. Once again, because each of the first and second walking beams 20, 40 is separately and independently pivotable about the respective first and second pivot axis from the other, the first and second walking beams 20, 40 are operative to respond simultaneously and/or sequentially as necessary to all surface deviations encountered by each wheel and tire 60, 61 on each side 14, 16 of the chassis 12 to maintain all wheels and tires 60, 61 of the vehicle in contact with the surface.

2. Connectors for the Dynamic Coupling.

The first and second walking beams 20, 40 each have a respective connector 38, 58 for connecting the walking beam to the dynamic coupling 70, which is described in detail below. The connectors 38, 58 can be substantially the same.

The connectors 38, 58 preferably are located on the respective first (inner facing) sides 26, 46 of the respective first and second walking beams 20, 40 directly opposite each other on the opposite first and second sides 14, 16 of the chassis 12. The connectors 38, 58 also preferably are located on the respective first and second walking beams 20, 40 at positions between the axes of rotation of the respective front and rear wheels and tires 60, 61. In the example embodiment, the connectors 38, 58 are located forward of the respective first and second pivot connectors 29, 49, i.e., closer to the respective front end portions 22, 42 of the respective first and second walking beams 20, 40 than the respective first and second pivot connectors 29, 49. Thus in the example embodiment, the connectors 38, 58 are located closer to the front wheels and tires 60, 61 and closer to the front end of the vehicle than the first and second pivot connectors 29, 49. However, it is contemplated and will be appreciated that in other embodiments, the connectors 38, 58 could be located between the respective first and second pivot connectors 29, 49 and the respective rear wheels and tires 60, 61 if desired.

The connector 38 on the first walking beam 20 is adapted to connect to a first end portion 92 of the lateral connector 90 of the dynamic coupling 70 and more specifically to a first telescopic connector 96 on the first end portion 92. Similarly, the connector 58 on the second walking beam 40 is adapted to connect to a second end portion 94 of the lateral connector 90 opposite of the first end portion 92 and more specifically to a second telescopic connector 98 on the second end portion 94. The first and second walking beams 20, 40 are thus dynamically and telescopically connected by the lateral connector 90 so that as they separately pivot relative to each other the telescopic connectors 96, 98 extend and contract (depending on the direction of the relative pivoting) and thus compensate for the change in distance between the points of connection with the lateral connector 90, i.e., the connectors 38, 58.

Each connector 38, 58 can be connected, attached to, or formed as part of the respective first and second walking beam 20, 40, and can comprise any mechanical connector suitable for the above described purpose. In an example embodiment, each connector 38, 58 comprises a lug or flange that projects inwardly from the respective first side 26, 46 of the respective first and second walking beam 20, 40 toward the chassis 12 and the walking beam on the opposite side of the chassis 12. Each connector 38, 58 has an opening that is arranged to be aligned with a corresponding opening of the respective first and second telescopic connector 96, 98 of the dynamic coupling 70 for connection. The connectors 38, 58 can be connected to the respective telescopic connectors 96, 98 of the lateral connector 90 by inserting a bolt or similar mechanical fastener through the aligned openings and securing with a nut or the like.

D. Dynamic Coupling

The dynamic coupling 70 is located between and is connected to the first walking beam 20, the second walking beam 40, and the chassis 12. The dynamic coupling 70 comprises a lateral connector 90 and a chassis connector 100, the structure and operation of which are described in detail in the sections below.

The dynamic coupling 70 provides a lateral connection between the first and second walking beams 20, 40 and a chassis connection between the lateral connection and the chassis 12. With these connections the dynamic coupling 70 enables the walking beam suspension 10 to support and suspend the chassis 12 of the vehicle on the walking beams 20, 40 and the connected surface contacting elements, e.g., wheels and tires 60, 61, above the surface on its own and without any additional surface contacting elements, e.g., axle and wheels, tow hitch to another vehicle, etc. being required.

The lateral connection and the chassis connection provided by the dynamic coupling 70 each comprise one or more dynamic connections. The dynamic connections dynamically adjust as each ground contacting element of a vehicle traversing a surface encounters a surface deviation and thus reduce the transfer of movements and disturbances caused by the surface deviations to the chassis 12.

More specifically, as a vehicle with the walking beam suspension 10 traverses a surface, one or more of the surface contacting elements, e.g., wheels and tires 60, 61, on the first and/or second sides of the chassis 12 may encounter surface deviations. In response, the first and second walking beams 20, 40 separately and independently pivot about the first and second pivot axes in the first and second directions (depending on the deviations) to maintain all the surface contacting elements in contact with the surface as described above. However, as the first and second walking beams 20, 40 pivot relative to each other the distance and angle between directly opposite points on the first and second walking beams 20, 40 changes. With a static rigid lateral connection between opposite points on the first and second walking beams 20, 40 and a static rigid connection between the lateral connection and the chassis 12, the changes in distance and angle would be transferred directly and unabated to the chassis 12 and to any load elements supported thereon.

With the dynamic coupling 70 however, the lateral connection between the first and second walking beams 20, 40 comprises dynamic connections to the first and second walking beams, and the chassis connection between the lateral connection and the chassis 12 comprises a dynamic connection to the lateral connection. As the first and second walking beams 20, 40 pivot relative to each other, the dynamic connections dynamically adjust to compensate for the change in distance and angle and thus reduce the transfer of movements and disturbances caused by the surface deviations to the chassis 12.

As described in detail in the sections below, the dynamic connections to the first and second walking beams 20, 40 adjust by extending and retracting substantially in the direction of the lateral axis of the vehicle (depending on the surface deviations) and the dynamic connection to the lateral connection adjusts to allow the lateral connection to pivot about and to move forward and backward along an axis that extends substantially in the direction of the longitudinal axis of the vehicle, i.e., the axis of the chassis connector 100.

1. Lateral Connector.

The lateral connector 90 of the dynamic coupling 70 comprises an elongated member having a first end portion 92 and a second end portion 94 opposite of the first end portion 92. The lateral connector 90 is preferably constructed of a strong, rigid, and light-weight material, such as a light-weight metal.

While the lateral connector 90 of the example embodiment is represented as a substantially linear beam or bar, that is merely one example configuration and it will be appreciated that the lateral connector 90 may have many different configurations consistent with the objectives and functionality of the example embodiments as described herein. As additional examples the lateral connector 90 may comprise an elongated non-linear member or a plurality of elongated interconnected linear and/or non-linear members. The lateral connector 90 also may comprise a multi-member or monolithic closed or open frame structure, and the frame structure may have numerous geometric shapes and may be substantially planar or may be three dimensional. The lateral connector 90 also may comprise a partially or wholly solid structure and the structure may have numerous different geometric shapes in either two or three dimensions. All such variations and others that are consistent with the objectives and functionality of the example embodiment as described herein are intended to be included.

The lateral connector 90 extends substantially in the direction of the lateral axis of the vehicle between the first and second walking beams 20, 40. The lateral connector 90 is connected at its first end portion 92 to the connector 38 of the first walking beam 20 and at its second end portion 94 to the connector 58 of the second walking beam 40 as described above. The lateral connector 90 is also connected at approximately its mid-point between the first and second walking beams 20, 40 to the chassis connector 100, which is described in detail below, and via the chassis connector to the chassis 12.

As described above, the connectors 38, 58 are preferably located on the respective first and second walking beams 20, 40 between the respective first and second pivot connectors 29, 49 and the front surface contacting elements, i.e., the front wheels and tires 60, 61. Hence, the lateral connector 90 extends laterally between the first and second walking beams 20, 40 at a location that is between the location of the first and second pivot axes of the respective first and second walking beams 20, 40 and the location where the front surface contacting elements are connected to the first and second walking beams 20, 40. This location is beneficial because as the front surface contacting elements encounter surface deviations causing the first and/or second walking beams 20, 40 to pivot about the first and/or second pivot axes, the lateral connector 90 experiences less movement and disturbance than the surface contacting elements do because it is closer to the pivot axes. Because the lateral connector 90 experiences less movement and disturbance, there is less movement and disturbance to be transferred from the lateral connector 90 to the chassis 12 through the chassis connection 100.

It is contemplated and will be appreciated that in another embodiment the connectors 38, 58 of the respective first and second walking beams 20, 40 and the lateral connector 90 could be located between the respective first and second pivot connectors 29, 49 and the respective rear wheels and tires 60, 61. A similar benefit to that described above would be obtained with that arrangement because the lateral connector 90 would be located closer to the first and second pivot axes of the first and second walking beams 20, 40 than the rear surface contacting elements.

It is also contemplated and will be appreciated that in other embodiments the lateral connector 90 could be located neither substantially forward nor substantially rearward of the first and second pivot connectors 29, 49 and corresponding first and second pivot axes of the respective first and second walking beams 20, 40, but rather substantially above or below the first and second pivot axes. Such an arrangement would still provide the benefit described above because the lateral connector 90 would be closer to the first and second pivot axes than the surface contacting elements would be.

The lateral connection between the first and second walking beams 20, 40 provided by the lateral connector 90 and the connection of the lateral connector 90 to the chassis 12 via the chassis connector 100 enable the walking beam suspension 10 to support and suspend the chassis 12 of the vehicle on the walking beams 20, 40 and the surface contacting elements e.g., wheels and tires 60, 61, above the surface on its own and without any additional surface contacting elements being required. The connection between the lateral connector 90 and the chassis 12 prevents the chassis 12 from being able to freely pivot about the first and second pivot axes of the respective first and second pivot connectors 29, 49 of the respective first and second walking beams 20, 40. The chassis 12 and any platform or load elements supported thereon are thus prevented from pivoting in the direction of the longitudinal axis of the vehicle and are unable to come into contact with the surface. In that way, the walking beam suspension 10 thus provides the sole and independent support for the chassis 12 and/or a platform or elements of a load supported thereon.

Figure 13A:
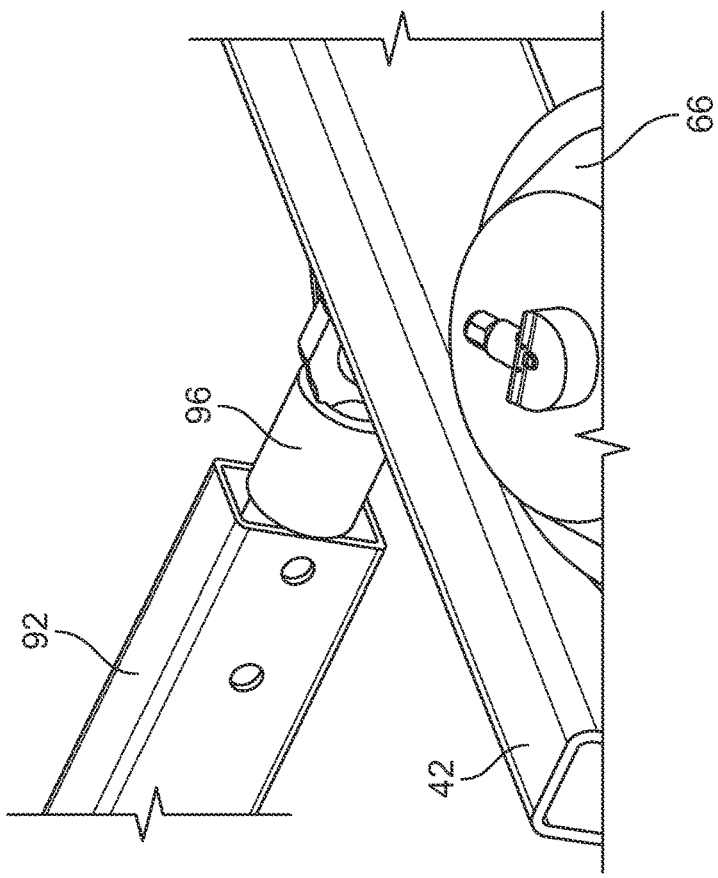
FIG. 13A is an enlarged top perspective view of a portion of a robotic vehicle with a walking beam suspension in accordance with an example embodiment illustrating first and second telescoping connections between a lateral walking beam connector and first and second opposed walking beams.
Figure 13A:
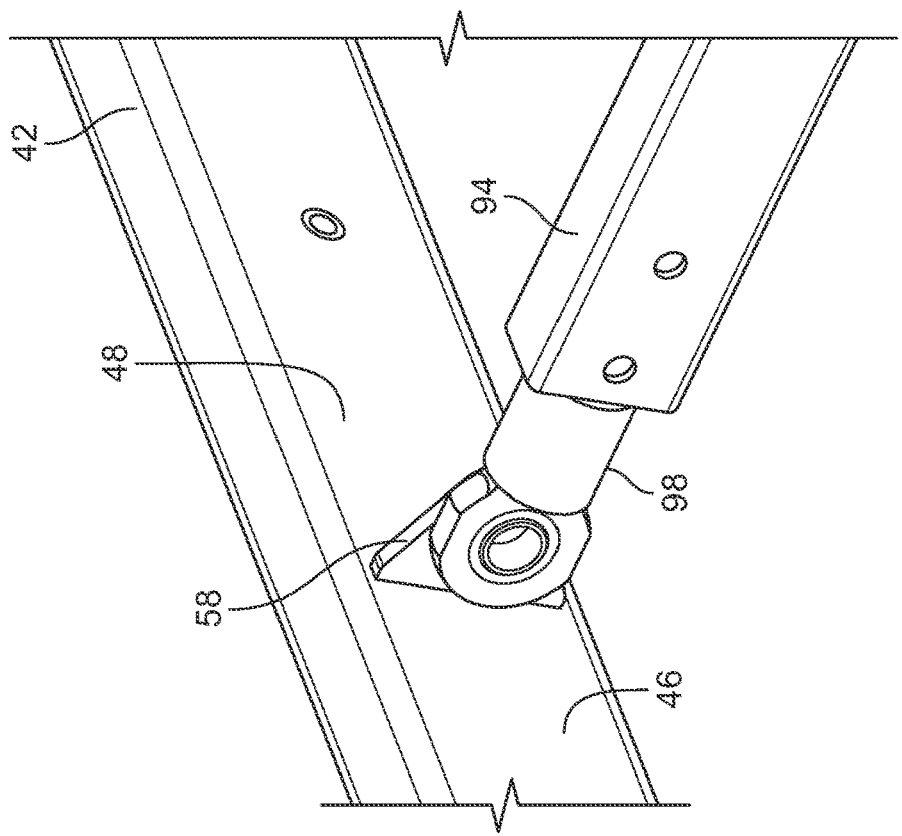

As described above, the connections between the first and second end portions 92, 94 of the lateral connector 90 and the respective connectors 38, 58 of the respective first and second walking beams 20, 40 are dynamic connections that dynamically adjust as the first and second walking beams 20, 40 pivot relative to each other. As best illustrated in FIGS. 13A-13B, the first end portion 92 comprises a first telescopic connector 96 that is adapted to be connected to the connector 38 of the first walking beam 20 as described above. The second end portion 94 comprises a second telescopic connector 98 that is adapted to be connected to the connector 58 of the second walking beam 40 also as described above. The first and second telescopic connectors 96, 98 are adapted to extend and retract inwardly and outwardly relative to the respective first and second end portions 92, 94 of lateral connector 90 and the first and second walking beams 20, 40 substantially in the direction of the lateral axis of the vehicle as the first and second walking beams 20, 40 separately pivot about the first and second pivot axes relative to each other and the chassis 12.

The dynamic adjustments of the connections between the first and second end portions 92, 94 of the lateral connector 90 and the respective first and second walking beams 20, 40 by the first and second telescopic connectors 96, 98 extending and retracting (depending on the direction of the relative pivoting of the walking beams) compensate for the change in the distance and angle between the connectors 38, 58 as the respective first and second walking beams 20, 40 pivot relative to each other. The movements and disturbances that are transferred to the chassis 12 due to surface deviations are thus dynamically reduced and in that regard the lateral connector 90 effectively functions as a lateral stabilizer for the vehicle.

Each of the first and second telescopic connectors 96 and 98 can comprise a rigid elongated rod element 96A, 98A, an outer sleeve element 96B, 98B, and a stop element 96C, 98C. The rod element 96A, 98A has a first end portion with an opening that is arranged to be aligned with a corresponding opening of the respective connector 38, 58 of the respective first or second walking beam 20, 40 for connecting the telescopic connector 96, 98 to the respective first and second walking beam 20, 40 as described above. The outer sleeve element 96B, 98B and the stop element 96C, 98C can be elongated and substantially cylindrical. They are preferably connected and arranged to be abutting and substantially co-axial. The stop element 96C, 98C is preferably affixed or connected to the respective first and second end portions 92, 94 of the lateral connector 90. The rod element 96A, 98A extends through and is free to slide within the outer sleeve element 96B, 98B and the stop element 96C, 98C substantially in the direction of the lateral axis of the vehicle. The rod element 96A, 98A is thus free to extend outwardly and to retract inwardly with respect to the respective first and second end portions 92, 94 of the lateral connector 90. The stop element 96C, 98C is preferably adapted to engage a portion of the rod element 96A, 98A and to prevent it from retracting within the lateral connector 90 beyond a certain amount.

In the example embodiment, it is preferred that both of the first and second end portions 92, 94 of the lateral connector 90 comprise dynamic connections and more specifically telescopic connectors 96, 98 as described. However, it is contemplated and will be appreciated that in some other embodiments it may be necessary or desired for only one of the first and second end portions 92, 94 to comprise a dynamic connection and that variation is thus intended to be included within the scope of the embodiments described herein.

2. Chassis Connector.

The chassis connector 100 of the dynamic coupling 70 comprises an elongated member having a first end portion 102 and a second end portion 104 opposite of the first end portion 102. The chassis connector 100 is preferably constructed of a strong, rigid, and light-weight material, such as a light-weight metal. While the chassis connector 100 of the example embodiment is represented as a substantially linear rod, bar, or shaft, that is merely one example configuration and it will be appreciated that the chassis connector 100 may have many different configurations consistent with the objectives and functionality of the example embodiments described herein, including any of the various configurations described above with respect to the lateral connector 90.

The chassis connector 100 extends substantially in the direction of the longitudinal axis of the vehicle between the lateral connector 90 and the chassis 12. The first end portion 102 comprises a first connection 106 to the chassis 12, preferably at approximately the mid-point of the chassis 12 between the first and second walking beams 20, 40. The first connection 106 is a fixed non-movable connection. The second end portion 104 comprises a second connection 108 to the lateral connector 90, preferably at approximately the mid-point of the lateral connector 90 between the first and second walking beams 20, 40. The second connection 108 comprises a dynamic movable connection.

Figure 14A:
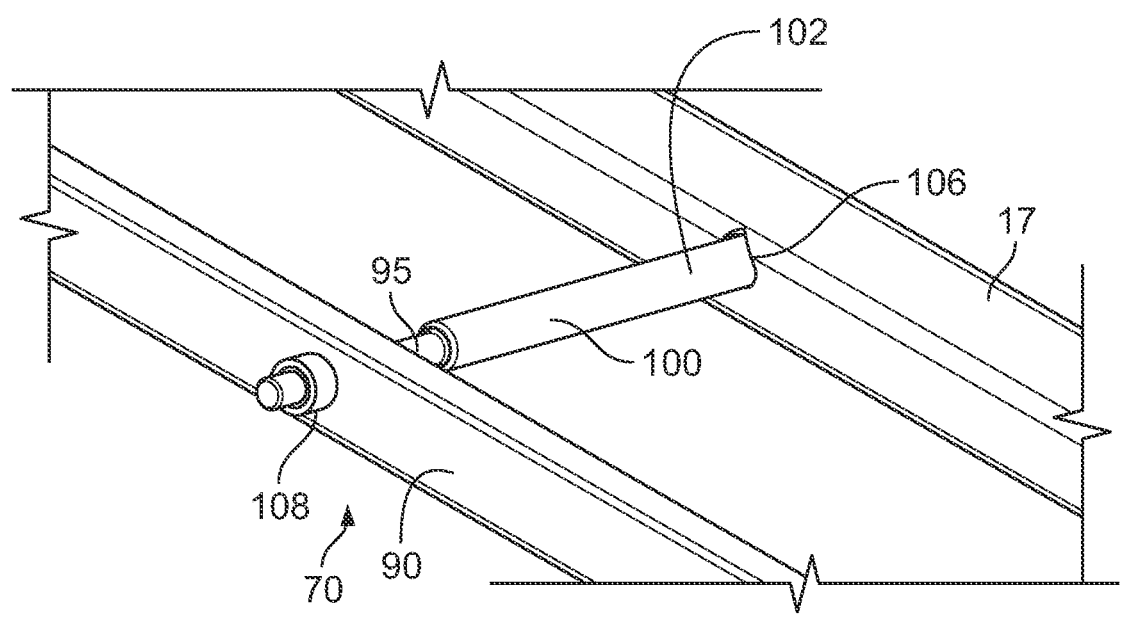
FIG. 14A is an enlarged top perspective view of a portion of a robotic vehicle with a walking beam suspension in accordance with an example embodiment illustrating a chassis connector connected between the lateral walking beam connector and the chassis of the vehicle.
Figure 14B:
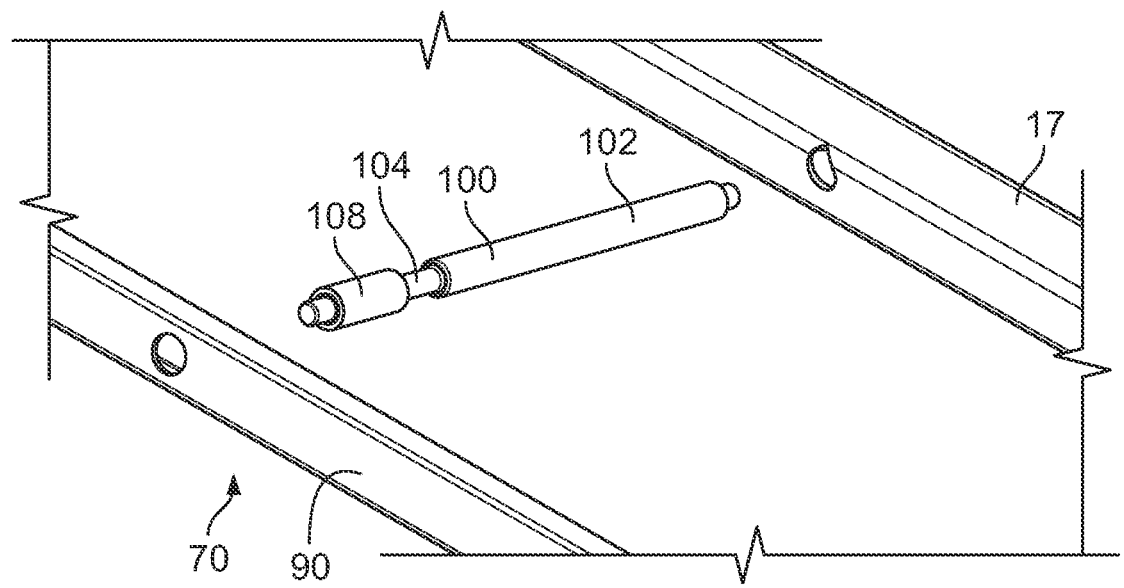
FIG. 14B is an exploded view of the portion of the robotic vehicle illustrated in FIG. 14A.

As best illustrated in FIGS. 14A-14B, the second connection 108 comprises a third pivot connector that has a third pivot axis and that is also linearly movable forward and rearward (relative to the vehicle and the first and second walking beams 20, 40) along the third pivot axis. The third pivot axis corresponds with the longitudinal axis of the chassis connector 100, extends substantially in the direction of the longitudinal axis of the vehicle, and is substantially perpendicular to the first and second pivot axes of the first and second pivot connectors 29, 49 to which the first and second walking beams 20, 40 are connected. The lateral connector 90 is able to simultaneously pivot about the third pivot axis and dynamically move linearly along the third pivot axis as the first and second walking beams 20, 40 pivot about the first and second pivot axes relative to each other and the chassis 12. The second connection 108 thus dynamically adjusts and compensates for the change in distance and angle between the first and second walking beams 20, 40 as they pivot relative to each other and dynamically reduces the movements and disturbances that are transferred to the chassis 12 as the vehicle encounters surface deviations.

In the example embodiment, the second connection 108 comprises a single member that is both pivotable and slidable on the chassis connector 100 at or near its second end portion 104. More specifically, the single member is both pivotable about and linearly movable in the direction of the longitudinal axis of the chassis connector 100 at and near its second end portion 104. The single member can comprise an elongated substantially cylindrical structure, such as a bushing or similar structure. The member can be fixedly connected or attached to the lateral connector 90 in any suitable fashion. For example the member can be inserted and fixedly retained in an opening in a face of the lateral connector 90. The second end portion 104 of the chassis connector 100 extends into and can extend through the member so as to enable it and the lateral connector 90 to freely pivot and linearly slide on the second end portion 104 of the chassis connector 100. A stop element, such as a shoulder, can be formed on an exterior surface of the chassis connector 90 at a location between the second end portion 104 and the first end portion 102. The stop member is adapted to engage the member and to prevent it from sliding further toward the first end portion 104 and the chassis 12 thus limiting the range of linear motion of the dynamic connection.

It is contemplated and will be appreciated that while the chassis connector 100 extends substantially in the direction of the longitudinal axis of the vehicle between the lateral connector 90 and the chassis 12 in the example embodiment, it could also be arranged to extend substantially in the direction of the vertical axis of the vehicle or even in a direction having components in both the longitudinal and vertical axes of the vehicle. Such variations are thus intended to be included within the scope of the embodiments described herein.

Figure 16A:
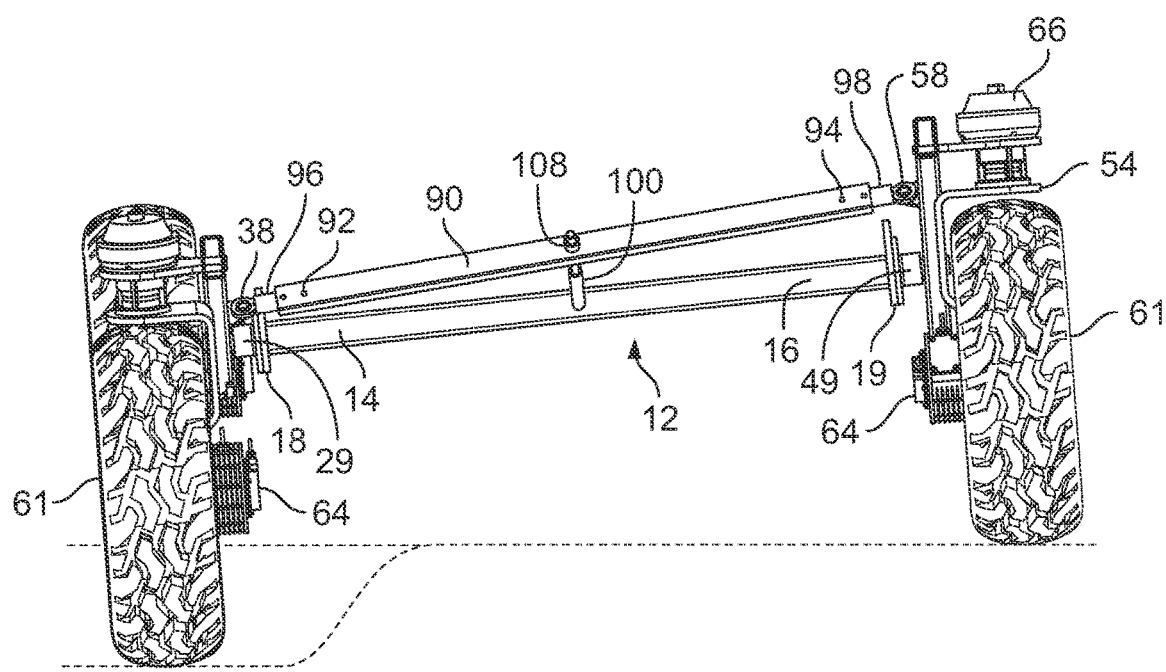
FIG. 16A is a front end view of a robotic vehicle with a walking beam suspension in accordance with an example embodiment illustrating the reaction of the suspension to a front wheel on a first side of the vehicle encountering a surface depression.

FIGS. 15A-15H and 16A-16H illustrate graphically how the first and second walking beams 20, 40 and the dynamic coupling 70 respond to each of the surface contacting elements, e.g., front and rear wheels and tires 60, 61, on each of the first and second sides 14, 16 of the chassis 12 of a vehicle encountering deviations in a surface the vehicle is traversing. For example, as shown in FIGS. 15A and 16A, when the front wheel and tire 60, 61 on the first side 14 of the chassis 12 encounters a surface depression, the first walking beam 20 pivots downward toward the front wheel relative to the second walking beam 40 and the chassis 12 to maintain both the front and rear wheels on the first side in contact with the surface. In response to the first walking beam 20 pivoting downward relative to the second walking beam 40, the lateral connector 90 dynamically pivots counter-clockwise (viewed from the front end of the vehicle) about the longitudinal axis of the chassis connector 100. Simultaneously, the first and/or second telescopic connectors 96, 98 may dynamically extend or retract and the lateral connector 90 may dynamically move linearly on the chassis connector 100 forward or backward depending on the size and/or severity of the depression. These dynamic adjustments compensate for any difference in distance and angle between the first and second walking beams 20, 40 caused by the depression and reduce the amount of any movement, e.g., longitudinal and/or lateral tilting, that is transferred to the chassis 12.

Figure 16B:
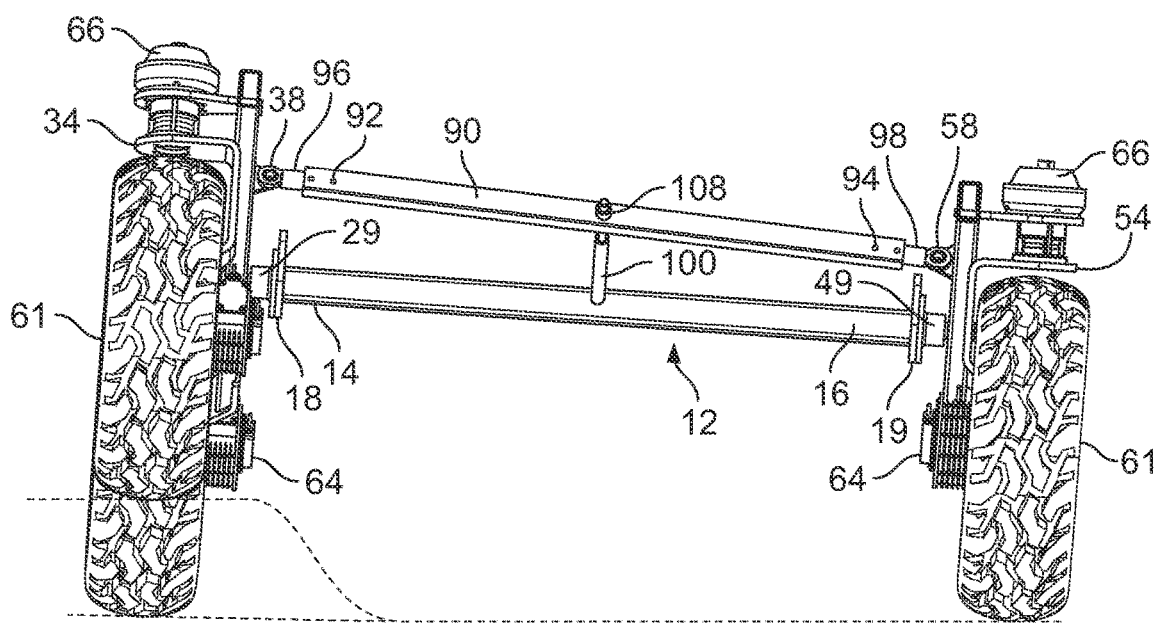
FIG. 16B is a front end view of a robotic vehicle with a walking beam suspension in accordance with an example embodiment illustrating the reaction of the suspension to a front wheel on a first side of the vehicle encountering a surface elevation.
Figure 16C:
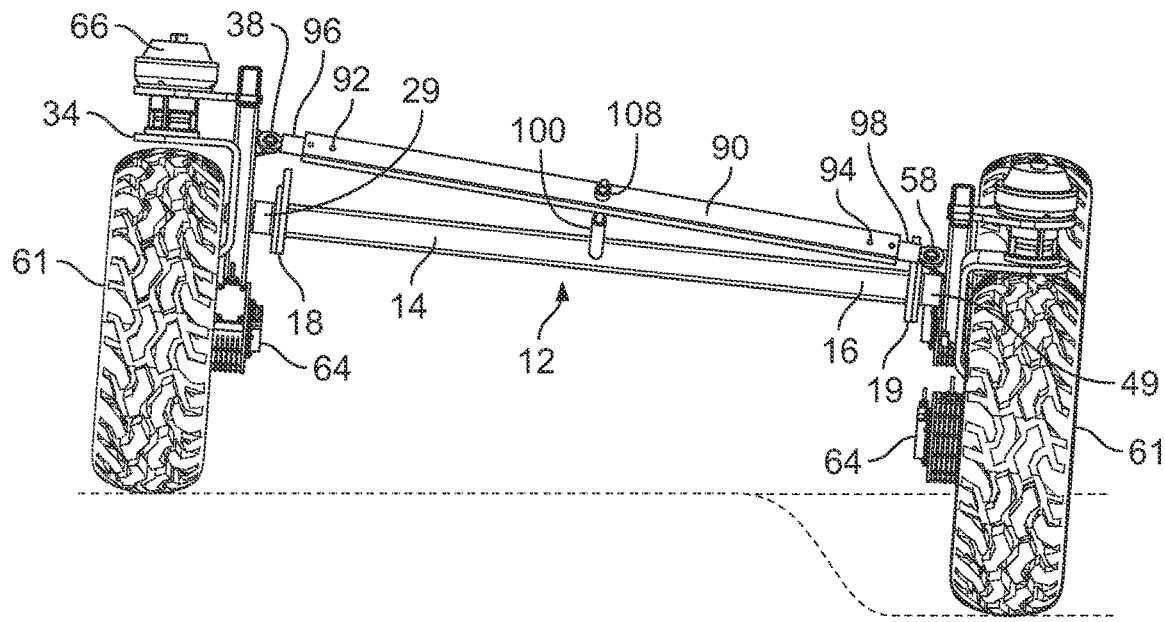
FIG. 16C is a front end view of a robotic vehicle with a walking beam suspension in accordance with an example embodiment illustrating the reaction of the suspension to a front wheel on a second side of the vehicle encountering a surface depression.
Figure 16D:
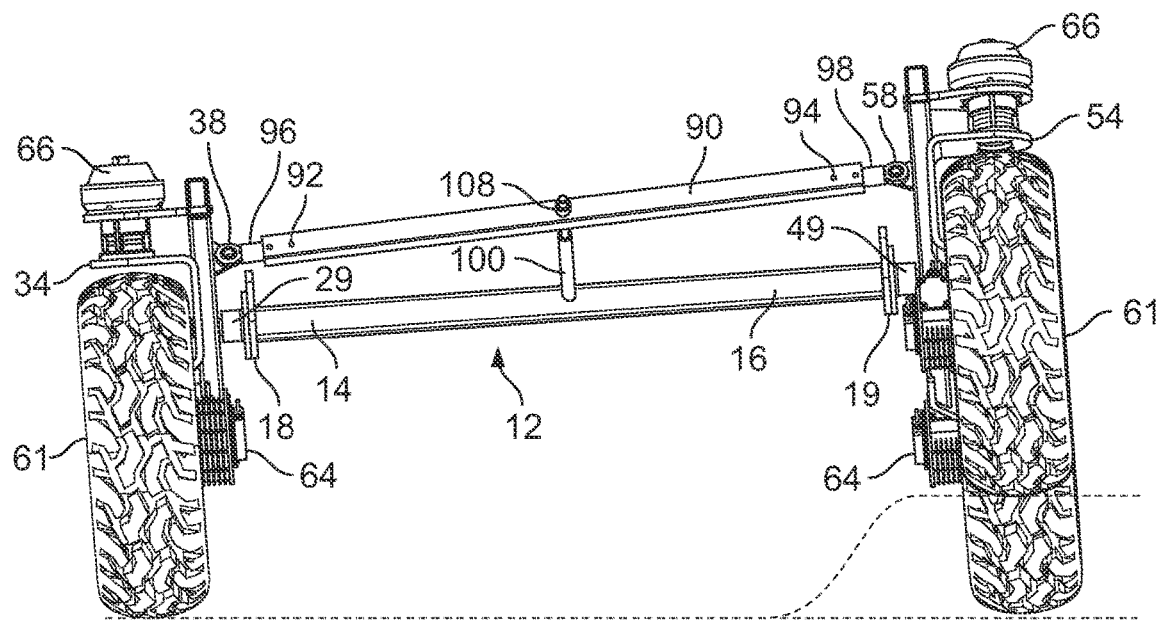
FIG. 16D is a front end view of a robotic vehicle with a walking beam suspension in accordance with an example embodiment illustrating the reaction of the suspension to a front wheel on a second of the vehicle encountering a surface elevation.
Figure 16E:
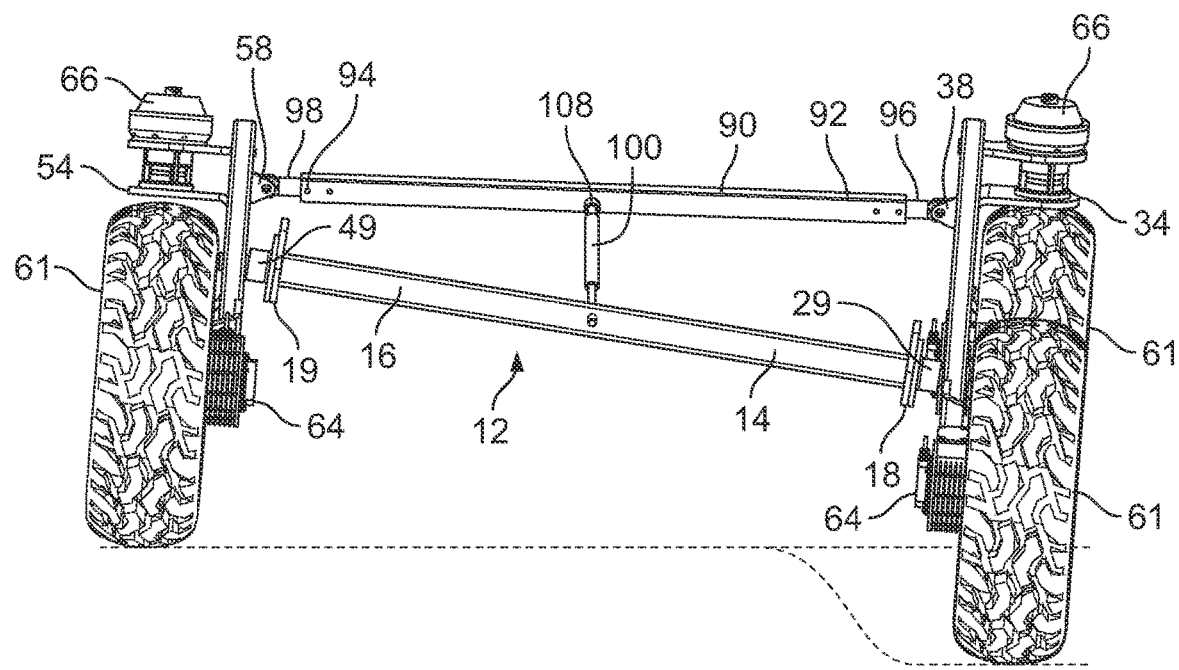
FIG. 16E is a rear end view of a robotic vehicle with a walking beam suspension in accordance with an example embodiment illustrating the reaction of the suspension to a rear wheel on a first side of the vehicle encountering a surface depression.
Figure 16F:
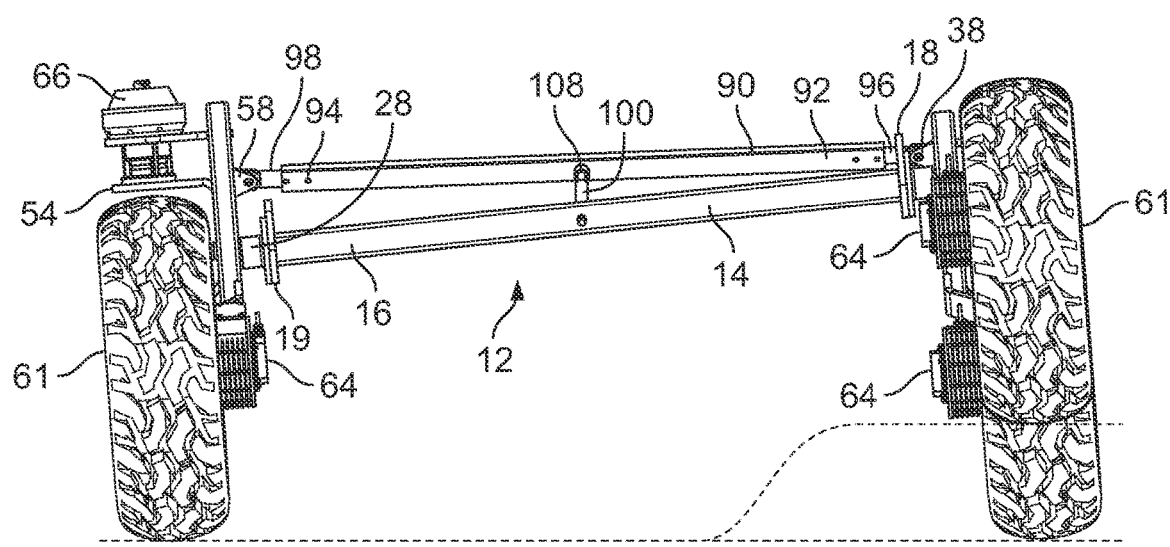
FIG. 16F is a rear end view of a robotic vehicle with a walking beam suspension in accordance with an example embodiment illustrating the reaction of the suspension to a rear wheel on a first side of the vehicle encountering a surface elevation.
Figure 16G:
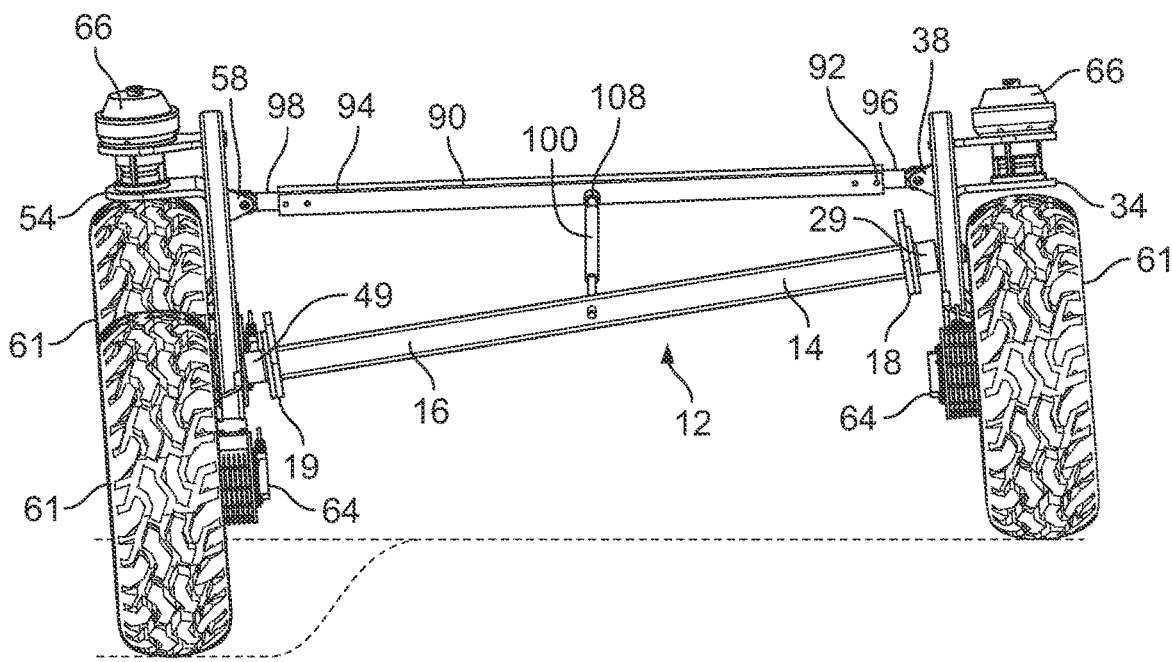
FIG. 16G is a rear end view of a robotic vehicle with a walking beam suspension in accordance with an example embodiment illustrating the reaction of the suspension to a rear wheel on a second side of the vehicle encountering a surface depression.
Figure 16H:
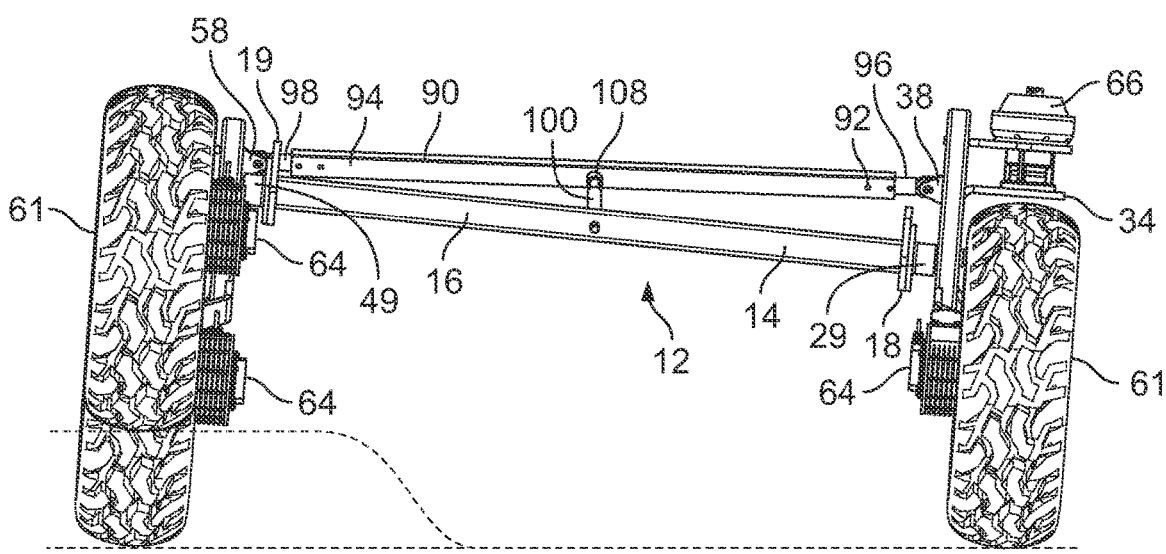
FIG. 16H is a rear end view of a robotic vehicle with a walking beam suspension in accordance with an example embodiment illustrating the reaction of the suspension to a rear wheel on a second side of the vehicle encountering a surface elevation.

Similarly as shown in FIGS. 15B and 16B, when the front wheel and tire 60, 61 on the first side 14 of the chassis 12 encounters a surface elevation, the first walking beam 20 pivots upward toward the front wheel relative to the second walking beam 40 and the chassis 12 to maintain both the front and rear wheels on the first side in contact with the surface. In response, the lateral connector 90 dynamically pivots clockwise (viewed from the front end of the vehicle) about the longitudinal axis of the chassis connector 100. Again, the first and/or second telescopic connectors 96, 98 may also dynamically extend or retract and the lateral connector 90 may also dynamically move linearly on the chassis connector 100 forward or backward depending on the size and/or severity of the elevation. Again, these dynamic adjustments compensate for any difference in distance and angle between the first and second walking beams 20, 40 caused by the elevation and reduce the amount of any movement, e.g., longitudinal and/or lateral tilting, that is transferred to the chassis 12.

FIGS. 15C-15H and 16C-16H similarly illustrate for exemplary purposes the response of the first and second walking beams 20, 40 and the dynamic coupling 70 to each surface contacting element, e.g., each front and rear wheel and tire 60, 61, on each of the first and second sides 14, 16 of the chassis 12 encountering downward (depression) and upward (elevation) deviations in a surface the vehicle is traversing. It will of course be appreciated that a surface being traversed by a vehicle may have many and varied deviations that may be encountered by one or more of the wheels and tires 60, 61 on one or both sides 14, 16 of the chassis 12 simultaneously and/or sequentially. The first and second walking beams 20, 40 and the dynamic coupling 70 as described herein are adapted and operative to respond simultaneously and/or sequentially as necessary to all deviations encountered by the wheels and tires 60, 61 on each side 14, 16 of the chassis 12 to maintain all wheels and tires 60, 61 of the vehicle in contact with the surface and to reduce the transfer of any resulting movement, e.g., lateral and/or longitudinal tilting, to the chassis 12.

E. Wheels, Tires, and Motors

In the example embodiment, the movable surface contacting elements of the vehicle comprise a plurality of wheels and tires 60, 61. However, it will be appreciated that wheels and tires 60, 61 are merely examples and that other forms of movable surface contacting elements can be used either in place of or in addition thereto so long as consistent with the objectives and functionality of the embodiments described herein. For example, various different types and shapes of wheels 60 with or without tires 61 may be used. As additional examples, one or more tracks, skids, skis or the like may be used.

In the example embodiment, a rear wheel and tire 60, 61 is rotatably connected to the respective rear end portions 24, 44 of each of the first and second walking beams 20, 40, and a front wheel and tire 60, 61 is rotatably connected to the respective front end portions 22, 42 of each of the first and second walking beams 20, 40. The wheels and tires 60, 61 thus comprise a plurality of independent and separate surface contacting elements and points of moving contact between the vehicle and the surface it is to traverse.

Each of the front and rear wheels and tires 60, 61 is connected to be rotatable about a first axis of rotation that extends in the direction of the lateral axis of the vehicle to enable the vehicle to move on and over the surface in the direction of the longitudinal axis. Each of the front wheels and tires 60, 61 is also connected to be separately rotatable about a second axis of rotation that extends in the direction of the vertical axis of the vehicle substantially transverse to the first axis of rotation to enable the vehicle to be selectively steered or directed on and over a surface.

Figure 5:
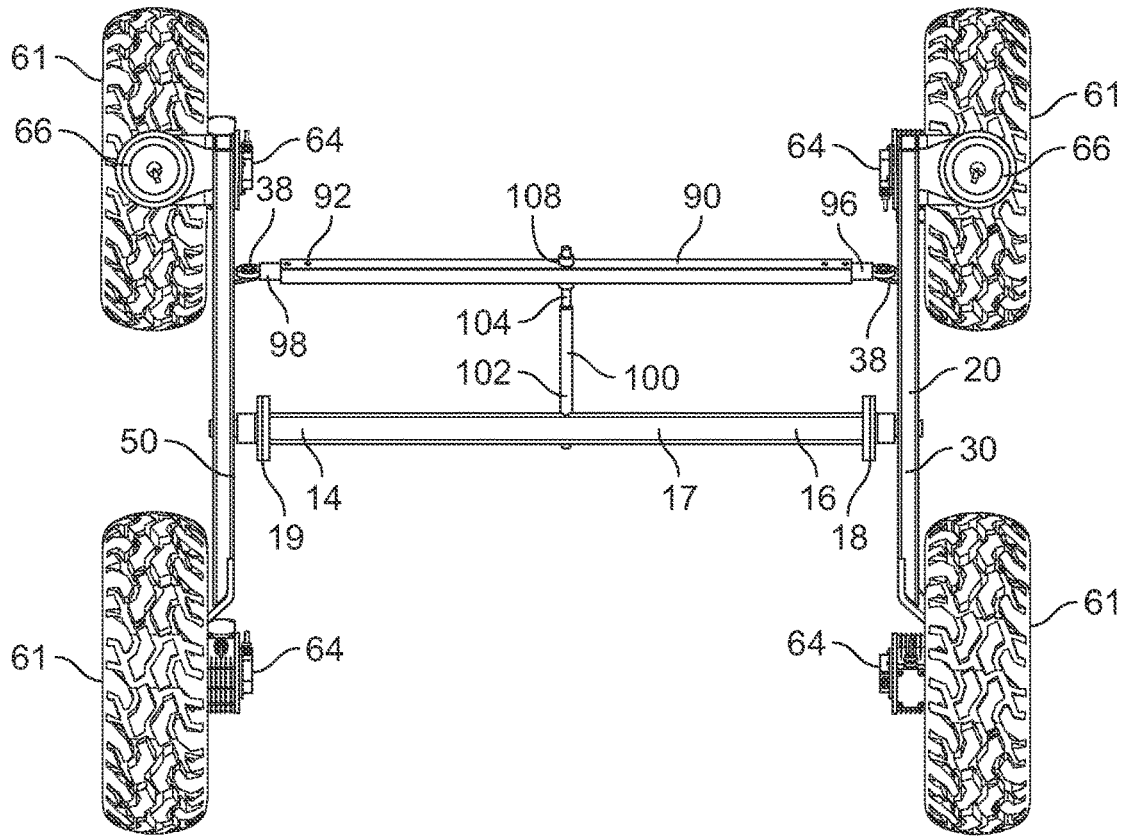
FIG. 5 is a top view of a robotic vehicle with a walking beam suspension in accordance with an example embodiment.
Figure 6:
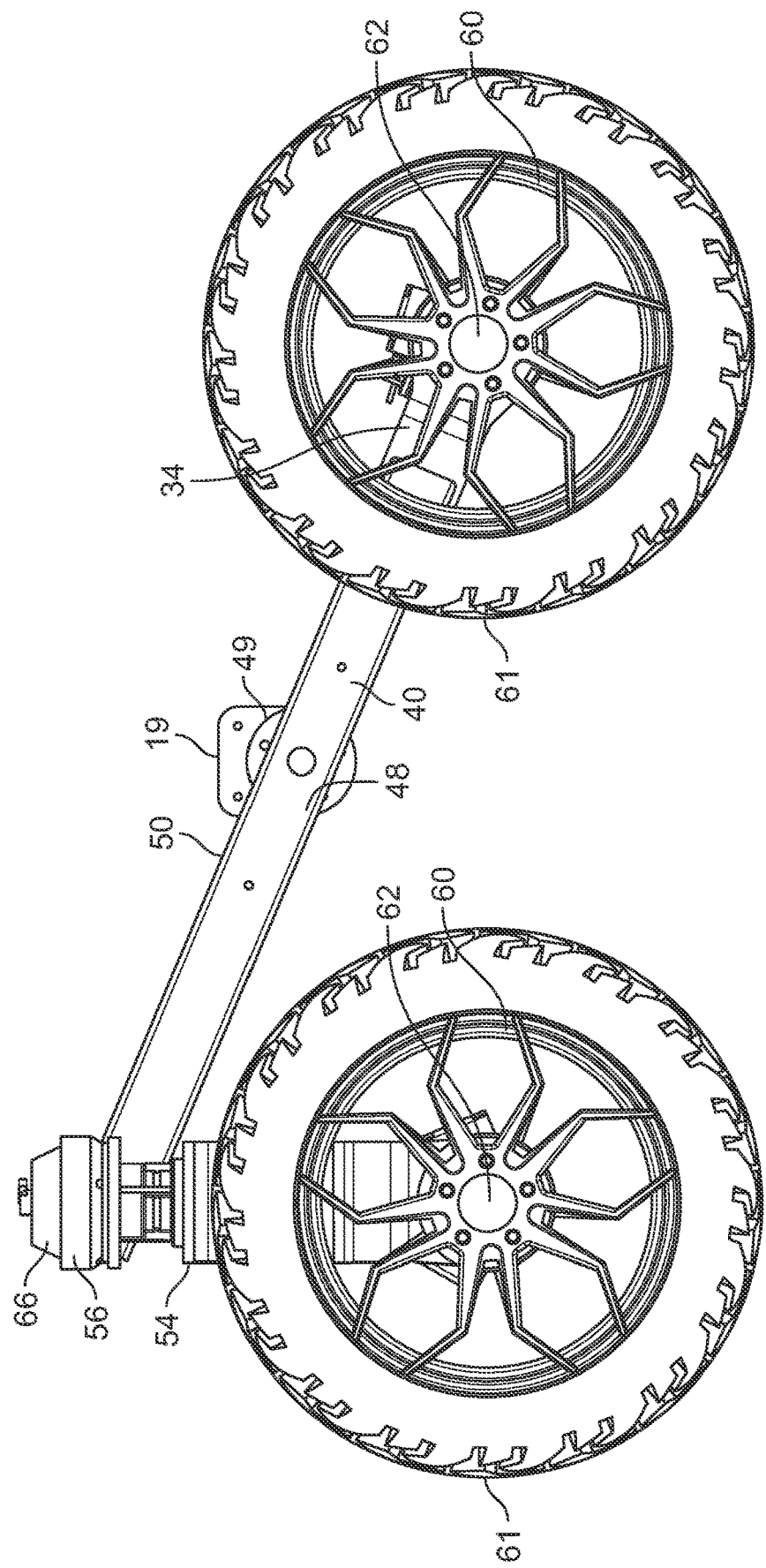
FIG. 6 is a left side view of a robotic vehicle with a walking beam suspension in accordance with an example embodiment.
Figure 7:
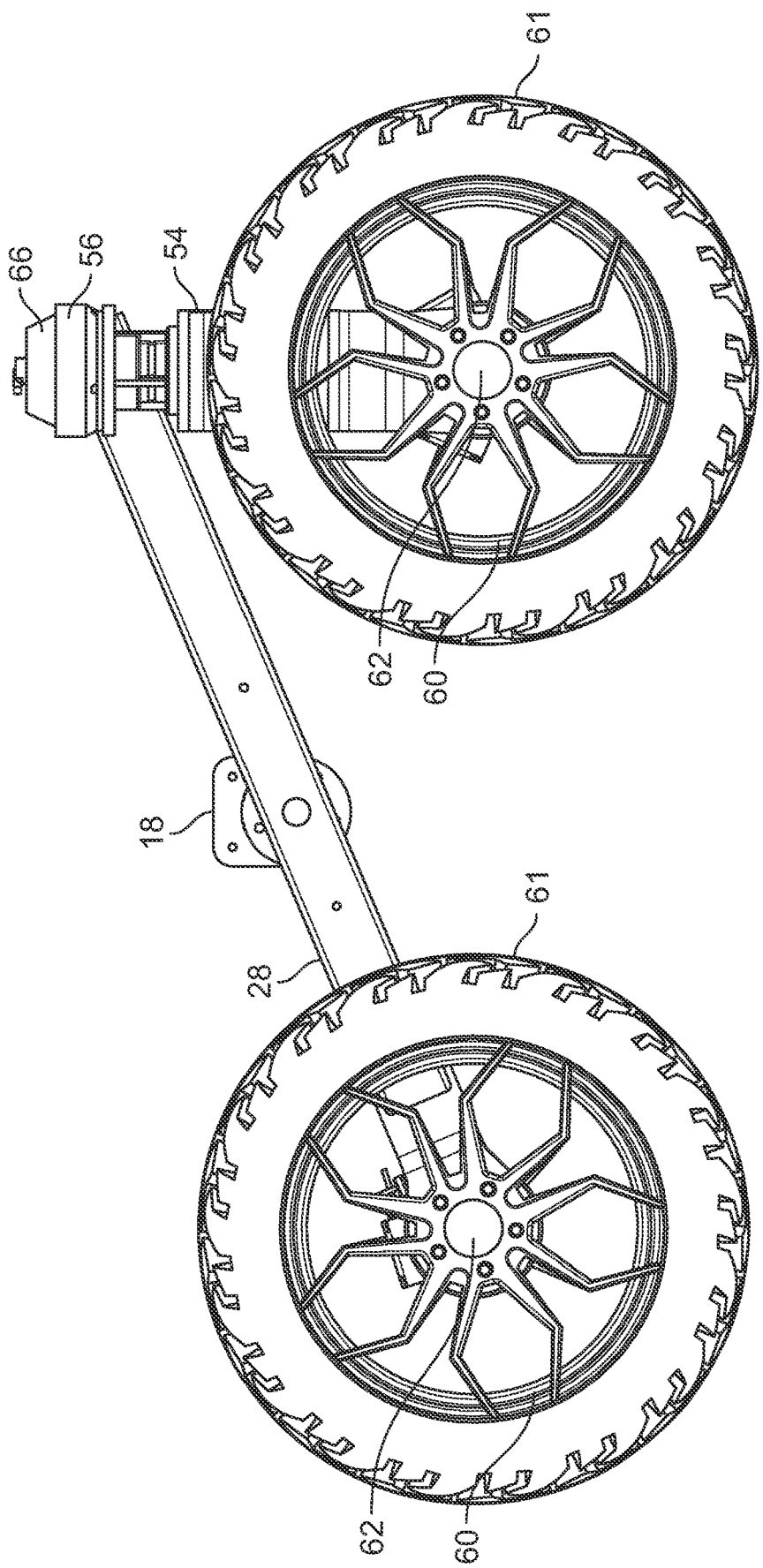
FIG. 7 is right side view of a robotic vehicle with a walking beam suspension in accordance with an example embodiment.
Figure 10:
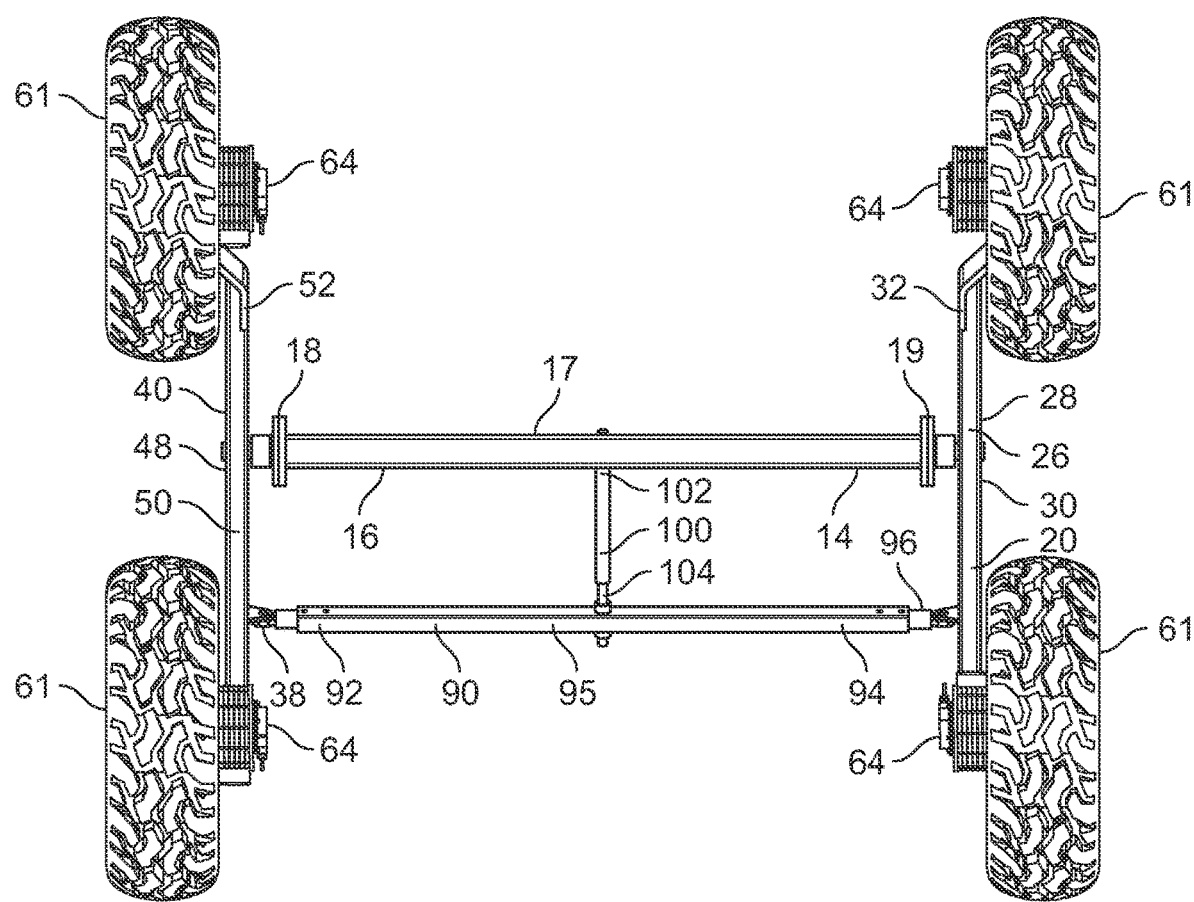
FIG. 10 is a bottom view of a robotic vehicle with a walking beam suspension in accordance with an example embodiment.
Figure 11:
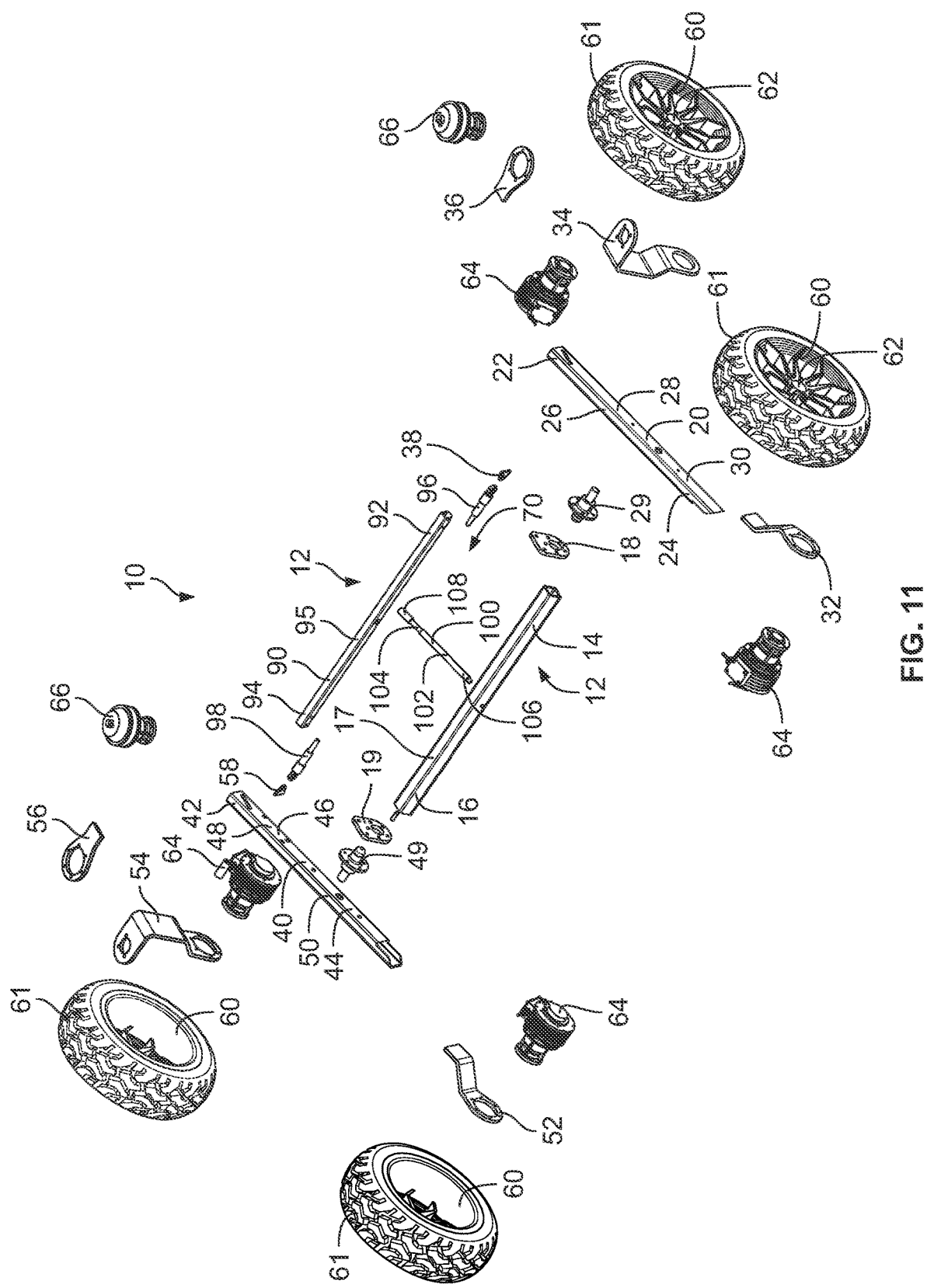
FIG. 11 top rear perspective exploded view of a robotic vehicle with a walking beam suspension in accordance with an example embodiment.
Figure 12A:
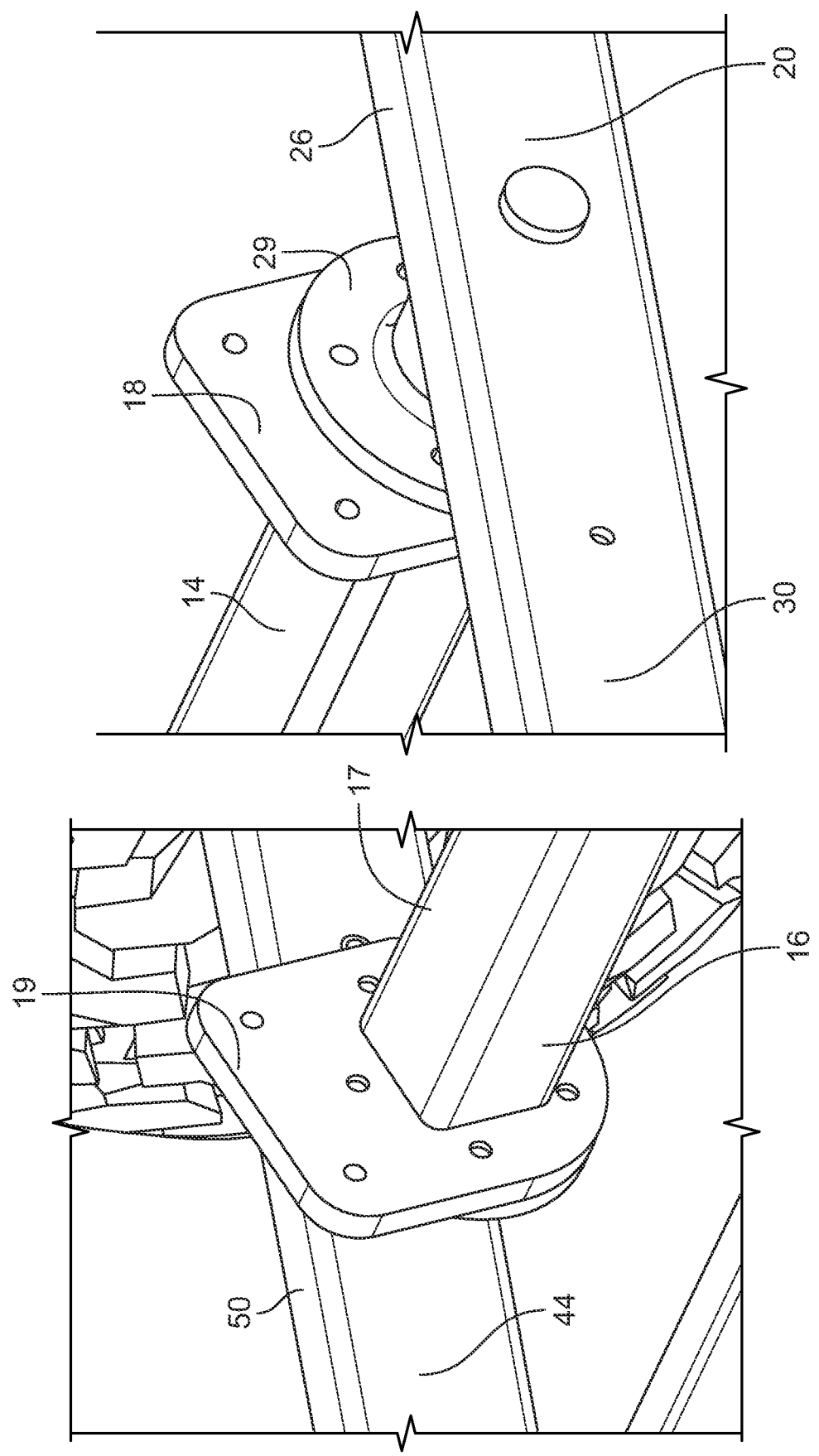
FIG. 12A is an enlarged top perspective view of a portion of a robotic vehicle with a walking beam suspension in accordance with an example embodiment illustrating first and second pivot connections between a chassis of the vehicle and first and second opposed walking beams.
Figure 12B:
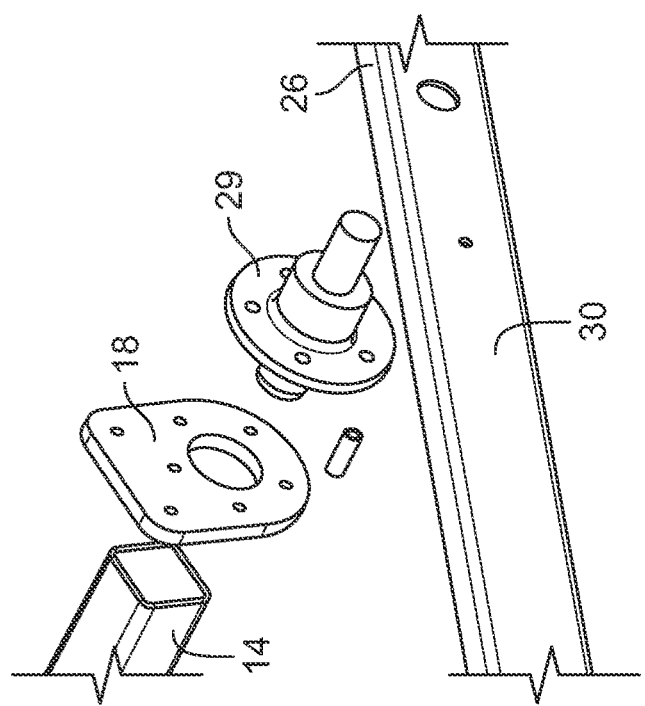
FIG. 12B is an exploded view of the portion of the robotic vehicle illustrated in FIG. 12A.
Figure 12B:
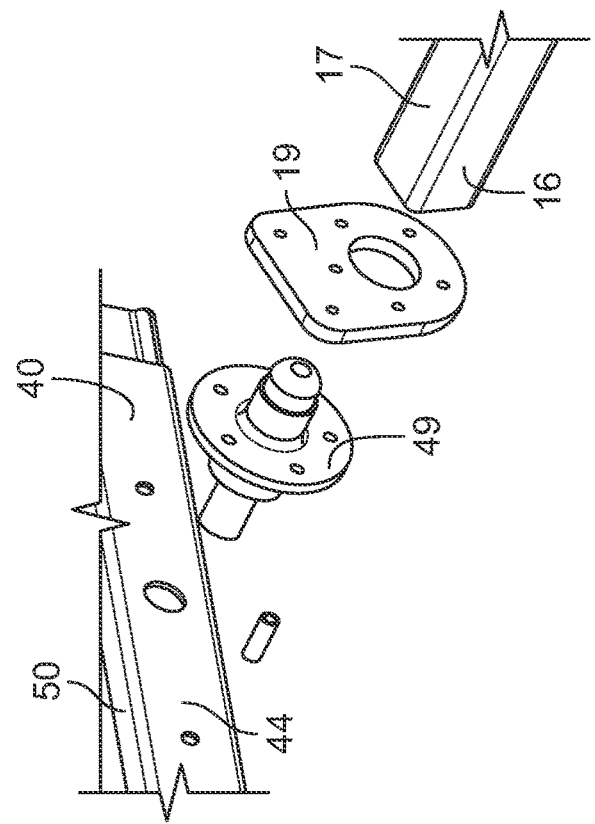

As best illustrated in FIGS. 5 and 10, preferably, but not necessarily, the corresponding rear wheels and tires 60, 61 rotatably connected to the first and second walking beams 20, 40 are arranged to be directly opposite each other with their first axes of rotation substantially coaxial, and the corresponding front wheels and tires 60, 61 connected to the first and second walking beams 20, 40 are arranged to be directly opposite each other with their first axes of rotation substantially coaxial. Also preferably, but not necessarily, the rear and front wheels 60, 61 connected to the first walking beam 20 are arranged to be substantially in-line, and the rear and front wheels 60, 61 connected to the second walking beam 40 are arranged to be substantially in-line (when the front wheels and tires 60, 61 are not rotated around the second axis to steer the vehicle).

A wheel adaptor or connector 32 can be connected to, attached to, or formed as part of the rear end portion 24 of the first walking beam 20 for rotatably connecting the rear wheel and tire 60, 61 to the first walking beam 20 to rotate about the first axis of rotation. The wheel adaptor or connector 32 can have a first end portion that is connected to, attached to, or formed as part of the rear end portion 24 and a second end portion that is opposite of the first end portion and that projects outwardly from the rear end portion 24 preferably substantially parallel thereto. A substantially identical wheel adaptor or connector 52 can be connected to, attached to, or formed as part of the rear end portion 44 of the second walking beam 40 for rotatably connecting the corresponding rear wheel and tire 60, 61 to the second walking beam 40 to rotate about the first axis of rotation. Each of the wheel adaptors or connectors 32, 52 can comprise an opening at or near its second end portion through which a hub 62 of a corresponding rear wheel 60 can be accessed.

Although it is not necessary to achieve the objectives or functionality of the walking beam suspension 10 for any of the wheels and tires 60, 61 to be directly driven, if it is desired to drive the rear wheels, a rotor or drive shaft of a drive motor 64 can extend through the opening of each wheel adaptor or connector 32, 52 and be connected to the hub 62 of the corresponding rear wheel 60 to selectively rotationally drive the corresponding rear wheel and tire 60, 61. The drive motor 64 can be an electric drive motor for example and can be powered by a self-contained power source, such as a battery mounted to the chassis 12. Alternatively, if it is not necessary or desired that the rear wheels and tires 60, 61 be driven, a short non-driven rotatable axle can extend through the opening of each wheel adaptor or connector 32, 52 and be rotatably connected to the hub 62 by suitable rotary bearings for example.

Figure 8:
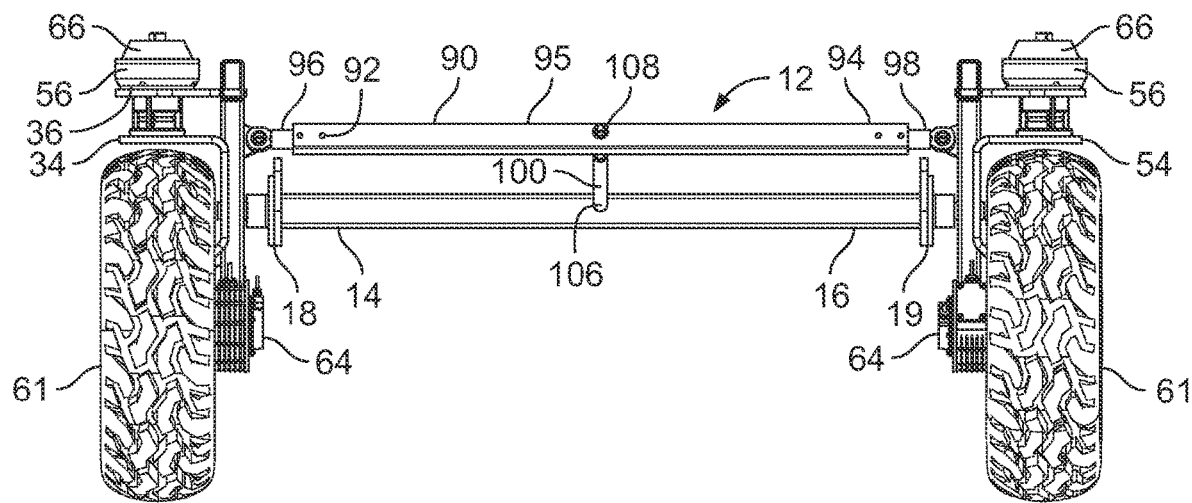
FIG. 8 is a front end view of a robotic vehicle with a walking beam suspension in accordance with an example embodiment.
Figure 9:
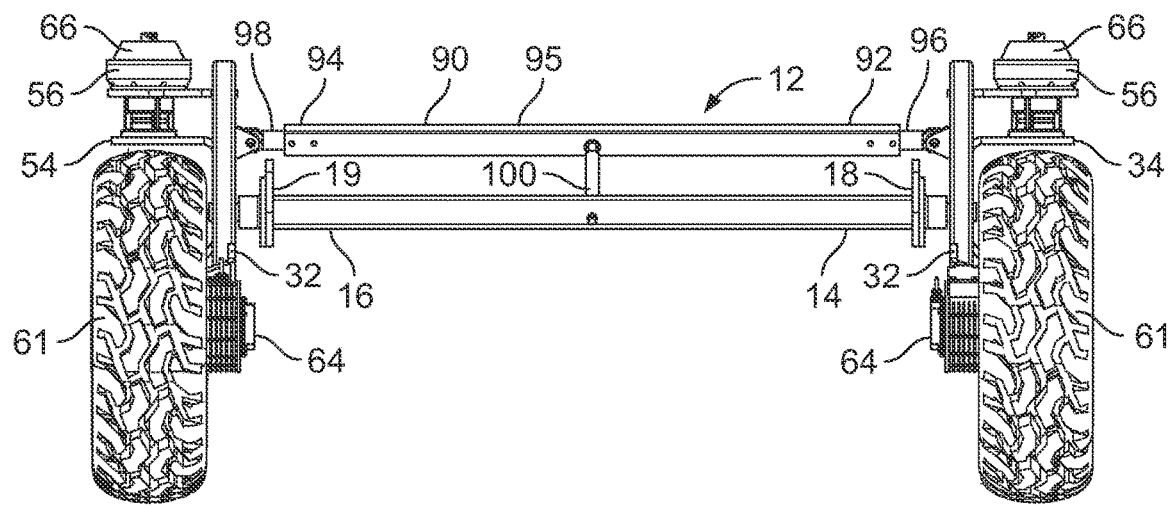
FIG. 9 is a rear end view of a robotic vehicle with a walking beam suspension in accordance with an example embodiment.

Similarly, although it is not necessary to achieve the objectives or functionality of the walking beam suspension 10 for any of the wheels and tires 60, 61 to be directly steerable, if steerability is desired a steering arm 34 can be rotatably connected or attached to the front end portion 22 of the first walking beam 20, and a substantially identical steering arm 54 can be rotatably connected or attached to the front end portion 42 of the second walking beam 40. Each steering arm 34, 54 can comprise an L-shape bracket for example. As viewed from the perspective of the front end of the vehicle and as best illustrated in FIGS. 1 and 8, each steering arm 34, 54 can have an upper portion that corresponds to the horizontal segment of the "L" and a lower portion that corresponds to the vertical segment of the "L." The upper portion projects outwardly away from the respective front end portion 22, 42 of the respective first and second walking beam 20, 40 over a corresponding front wheel and tire 60, 61. The lower portion projects downwardly from the upper portion along the inside of the corresponding front wheel and tire 60, 61.

The lower portion of each steering arm 34, 54 comprises a wheel adaptor or connector for rotatably connecting a corresponding front wheel and tire 60, 61 to the respective first or second walking beam 20, 40 to rotate about the first axis of rotation. The upper portion of each steering arm 34, 54 can be rotatably connectable to a rotor or drive shaft of a steering motor 66 to selectively rotate about the second axis of rotation to selectively steer or direct the front wheels and hence the vehicle.

Like the second end portion of each rear wheel adaptor 32, 52, the lower portion of each steering arm 34, 54 can comprise an opening through which a hub 62 of the corresponding front wheel 60 can be accessed. If it is desired to directly drive the front wheels, a rotor or drive shaft of a drive motor 64 can extend through the opening and be connected to the hub 62 of the corresponding front wheel 60 to selectively rotationally drive the corresponding front wheel and tire 60, 61 about the first axis of rotation. As noted above, the drive motor 64 can be an electric drive motor powered by a battery mounted to the chassis 12. Similar to the rear wheels and tires 60, 61, if it is not necessary or desired that the corresponding front wheels and tires 60, 61 be driven, the drive motor 64 can be omitted and a short non-driven rotatable axle can extend through the opening in the lower portion of each steering arm 34, 54, connect to the hub 62, and be rotatably connected to the steering arm 34, 55 and to the hub 62 by suitable rotary bearings for example.

The upper portion of each steering arm 34, 54 can comprise an opening for receiving and retaining a rotor or drive shaft of a corresponding steering motor 66. The steering motor 66 can be located above the upper portion of the steering arm 34, 54 with the rotor or drive shaft extending downwardly through the opening. The rotor or drive can be connected to the steering arm 34, 54 using a suitable clamp or other mechanical fastener for example. The steering motor 66 is thus operable to selectively rotationally drive the steering arm 34, 54 and the corresponding front wheel and tire 60, 61 about the second axis of rotation to selectively steer or direct the vehicle in a desired direction.

The steering arm 34 with its corresponding steering motor 66 can be rotatably connected to the front end portion 22 of the first walking beam 20 by a steering motor connector 36. The steering arm 54 with its corresponding steering motor 66 can be rotatably connected to the front end portion 42 of the second walking beam 40 by a substantially identical steering motor connector 56. Each steering motor connector 36, 56 has a first end portion that can be connected to, attached to, or formed as part of the respective first or second walking beam 20, 40. Each steering motor connector 36, 56 has a second end portion that is opposite of the first end portion and that projects outwardly from the respective front end portion 22, 42 of the respective first or second walking beam 20, 40 above the upper portion of the respective steering arm 34, 54. Each steering motor connector 36, 56 can have an opening that is aligned with the opening in the upper portion of the respective steering arm 34, 54. The steering motor 66 corresponding to a steering arm 34, 54 can be connected to and supported on the respective steering motor connector 36, 56 with its rotor or drive shaft extending downwardly through the aligned openings in the respective steering motor connector 36, 56 and upper portion of the corresponding steering arm 34, 54.

If it is not necessary or desired to use steering motors 66 to selectively rotate the respective steering arms 34, 54 and front wheels and tires 60, 61 about the second axis to steer or direct the vehicle, the steering motors 66 can be omitted and replaced with a non-driven rotatable connection between the respective steering arms 34, 54 and the steering motor connector 36 or directly between the respective steering arms 34, 54 and the respective first and second walking beams 20, 40. Similarly, if it is not necessary or desired to have the front wheels and tires 60, 61 be rotatable about the second axis for steering or directing the vehicle, the steering arms 34, 54 can be omitted and replaced with structures similar to the rear wheel connectors 32, 52 for rotatably connecting front wheels and tires 60, 61 to the front end portions 22, 42 of the respective first and second walking beams 20, 40.

It is contemplated and will be appreciated that even without steering motors 66 and rotatable steering arms 34, 54 the vehicle can still be steered or directed in any number of ways. As one example, the vehicle can be towed behind another steerable vehicle. As another example, the vehicle can be steered or directed by using skid steering by selectively operating drive motors 64 connected to each of the wheels 60 to cause one or more wheels and tires 60, 61 on each side of the chassis 12 to rotate in selected directions in order to propel the vehicle in a selected direction. For example, the wheels and tires 60, 61 on one end or side of the chassis 12 may be rotated in a forward direction while the wheels and tires on the opposite end or side are rotated in a reverse direction to cause the vehicle to rotate left or right. Similarly, the two wheels and tires 60, 61 on one side or end of the chassis may be rotated in a forward or reverse direction while the wheels and tires 60, 61 on the opposite end or side remain stationary to cause the vehicle to veer right or left.

Regardless of the steering mechanism or approach used for the vehicle, and even if the vehicle is not made steerable at all, the walking beam suspension 10 of the example embodiment operates substantially the same and provides substantially the same improvements and benefits described herein. Similarly, even if the vehicle is made non-driven and must be towed, pushed or otherwise motivated to traverse a surface, as long as the vehicle is able to traverse the surface, the walking beam suspension 10 of the example embodiment operates substantially the same and still provides substantially the same improvements and benefits described herein.

F. Exemplary Telecommunications Networks

Although remote control of the vehicle and remote communication with the vehicle are not necessary to achieve the objectives and functionality of the walking beam suspension 10, if remote control and/or communication are desired the example embodiment of the walking beam suspension 10 may be utilized with or upon any telecommunications network capable of transmitting data including voice data and other types of electronic data. Thus, while the walking beam suspension 10 may be used on autonomous agricultural and other autonomous vehicles wherein remote communication with the vehicle may not be necessary or desired, it also may be used on autonomous and semi-autonomous agricultural and other vehicles where remote communication with the vehicle components and/or elements of a load supported by the vehicle chassis 12 are necessary or desired. For example, components of a vehicle including the walking beam suspension 10, such as drive motors 64 and/or steering motors 66, may be fitted with transceivers and local control apparatus to receive and act on remotely communicated commands to propel and/or steer the vehicle. Similarly, elements of a load supported by a chassis 12 of a vehicle including the walking beam suspension 10, such as instruments, measurement devices, cropping equipment, etc., may be fitted with transceivers and local control apparatus to receive and act on remotely communicated commands to perform cropping functions, take measurements, and/or record and transmit data to a remote receiver.

Examples of telecommunications networks suitable for use with vehicles including the walking beam suspension 10 include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Components of such vehicles and/or elements of loads supported by the chassis 12 of such vehicles may communicate via a single telecommunications network or multiple telecommunications networks concurrently. Various protocols may be utilized by the electronic devices for communications such as but not limited to HTTP, SMTP, FTP and WAP (wireless Application Protocol). Various wireless networks may be utilized such as but not limited to 3G, 4G, LTE, CDPD, CDMA, GSM, PDC, PHS, TDMA, FLEX, REFLEX, IDEN, TETRA, DECT, DATATAC, and MOBITEX. Various online services and internet service providers may also be utilized for remote communications.

The Internet is an exemplary telecommunications network for remote communications with vehicles including the walking beam suspension 10 and load elements supported on the chasses 12 of such vehicles. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

G. Central Communication Unit

The central communication unit may be comprised of any central communication site where communications are preferably established with. The central communication units may be comprised of a server computer, cloud based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g. voice data, computer data, etc.).

H. Mobile Device

The mobile device may be comprised of any type of computer for communicating with and processing data associated with a vehicle including the walking beam suspension 10 and/or a load element supported on a chassis 12 of such a vehicle. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device may comprise any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the walking beam suspension. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

I. Operation of Preferred Embodiment

In use, the walking beam suspension 10 may be either incorporated into the assembly of an autonomous, semi-autonomous, or non-autonomous agricultural or other vehicle. Alternatively, the walking beam suspension 10 may be retrofitted into an existing vehicle.

Once the walking beam suspension 10 is incorporated into the vehicle, the vehicle incorporating the walking beam suspension 10 may be propelled under its own power or may be towed, trailered, etc. by a separate vehicle to a location where the vehicle is to be used. For example, if the vehicle is an agricultural vehicle for conducting certain cropping operations, the vehicle may be propelled or transported to a field or other crop site where the cropping operations are to be conducted.

Once at the desired location, the vehicle may be operated according to normal practice and without any particular changes to accommodate the walking beam suspension 10. As the vehicle traverses a surface, e.g., terrain or ground, to conduct the cropping operations, the wheels and tires 60, 61 or other surface contacting elements on opposite ends or sides 14, 16 of the chassis 12 of the vehicle may encounter various surface deviations. As surface deviations are encountered, the walking beam suspension 10 automatically operates to maintain all of the wheels and tires 60, 61 in contact with the surface and to reduce the transfer of any movements and disturbances to the chassis 12 and to any load elements supported thereon as described herein.

Depending on the vehicle, the vehicle may autonomously propel and direct itself, conduct cropping operations, and communicate data to a remote receiver. Alternatively, an operator may remotely communicate commands to components of the vehicle to propel and/or direct it, and may communicate commands to and receive data from various elements of a load supported on the chassis 12 of the vehicle, including instruments, measurement devices, and cropping equipment, to conduct cropping operations and receive associated data.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment including the walking beam suspension 10 may be described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the walking beam suspension will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the walking beam suspension, suitable methods and materials are described above. Thus, the walking beam suspension is not intended to be limited to the embodiments shown, but is to be accorded the widest scope consistent with the principles and features disclosed herein.

What is claimed is:

1. A walking beam suspension, comprising:
   a first walking beam that is adapted to be pivotably connected to a first side of a vehicle chassis and to have one or more first surface contacting elements connected;
   wherein the first walking beam is separately pivotable in response to the one or more first surface contacting elements encountering a first deviation in a surface to maintain each of the one or more first surface contacting elements in contact with the surface;
   a second walking beam that is adapted to be pivotably connected to a second side of the vehicle chassis and to have one or more second surface contacting elements connected;
   wherein the second walking beam is separately pivotable in response to the one or more second surface contacting elements encountering a second deviation in the surface to maintain each of the one or more second surface contacting elements in contact with the surface; and
   a dynamic coupling connected to the first walking beam and to the second walking beam, and adapted to be connected to the vehicle chassis;
   wherein the dynamic coupling is dynamically adjustable to reduce movement of the vehicle chassis from pivoting of the first walking beam and pivoting of the second walking beam;
   wherein the dynamic coupling is connected to the first walking beam by a first dynamic telescopic connector that is dynamically extendable and retractable.

2. The walking beam suspension of claim 1, wherein the dynamic coupling is connected to the second walking beam by a second dynamic connector.

3. The walking beam suspension of claim 1, wherein the dynamic coupling is connected to the second walking beam by a second dynamic telescopic connector that is dynamically extendable and retractable.

4. The walking beam suspension of claim 1, wherein the dynamic coupling is adapted to be connected to the vehicle chassis by a third dynamic connector.

5. The walking beam suspension of claim 1, wherein the dynamic coupling is adapted to be connected to the vehicle chassis by a third dynamic connector that is dynamically pivotable with respect to the vehicle chassis.

6. The walking beam suspension of claim 1, wherein the dynamic coupling is adapted to be connected to the vehicle chassis by a third dynamic connector that is dynamically linearly movable with respect to the vehicle chassis.

7. The walking beam suspension of claim 1, wherein the dynamic coupling is adapted to be connected to the vehicle chassis by a third dynamic connector that is dynamically pivotable and linearly movable with respect to the vehicle chassis.

8. The walking beam suspension of claim 1, wherein the dynamic coupling is dynamically adjustable by dynamically moving with respect to the first walking beam, the second walking beam, and the vehicle chassis to compensate for changes in a distance and an angle between the first walking beam and the second walking beam as the first walking beam pivots and as the second walking beam pivots.

9. The walking beam suspension of claim 1, wherein the first walking beam, the second walking beam, and the dynamic coupling together are adapted to support the vehicle chassis suspended above the surface independently of an external support.

10. A walking beam suspension, comprising:
    a first walking beam that is adapted to be pivotably connected to a first side of a vehicle chassis and to have one or more first surface contacting elements connected;
    wherein the first walking beam is separately pivotable in response to the one or more first surface contacting elements encountering a first deviation in a surface to maintain each of the one or more first surface contacting elements in contact with the surface;
    a second walking beam that is adapted to be pivotably connected to a second side of the vehicle chassis and to have one or more second surface contacting elements connected;
    wherein the second walking beam is separately pivotable in response to the one or more second surface contacting elements encountering a second deviation in the surface to maintain each of the one or more second surface contacting elements in contact with the surface; and
    a dynamic coupling comprising:
      a lateral connector that extends in a direction of a lateral axis of the vehicle chassis between the first walking beam and the second walking beam, and that has a first end portion connected to the first walking beam by a first dynamic connector and a second end portion connected to the second walking beam by a second dynamic connector; and
      a chassis connector that extends in a direction of a longitudinal axis of the vehicle chassis between the lateral connector and the vehicle chassis, and that has a first end portion adapted to be connected to the vehicle chassis and a second end portion connected to the lateral connector by a third dynamic connector;
    wherein the first dynamic connector, the second dynamic connector, and the third dynamic connector are each dynamically adjustable to reduce movement of the vehicle chassis from pivoting of the first walking beam and pivoting of the second walking beam.

11. The walking beam suspension of claim 10, wherein the first dynamic connector comprises a first dynamic telescopic connector that is dynamically extendable and retractable between the first end portion of the lateral connector and the first walking beam.

12. The walking beam suspension of claim 10, wherein the first dynamic connector comprises a first dynamic telescopic connector that is dynamically extendable and retractable between the first end portion of the lateral connector and the first walking beam, and the second dynamic connector comprises a second dynamic telescopic connector that is dynamically extendable and retractable between the second end portion of the lateral connector and the second walking beam.

13. The walking beam suspension of claim 10, wherein the third dynamic connector is dynamically pivotable with respect to the vehicle chassis about an axis that extends in the direction of the longitudinal axis of the vehicle chassis.

14. The walking beam suspension of claim 13, wherein the third dynamic connector is dynamically linearly movable along the axis with respect to the vehicle chassis.

15. The walking beam suspension of claim 10, wherein the first dynamic connector and the second dynamic connector are dynamically adjustable by dynamically moving in the direction of the lateral axis of the vehicle chassis with respect to the first walking beam and the second walking beam to compensate for changes in a distance and an angle between the first walking beam and the second walking beam as the first walking beam pivots and as the second walking beam pivots.

16. The walking beam suspension of claim 10, wherein the third dynamic connector is dynamically adjustable by dynamically pivoting with respect to the vehicle chassis about an axis that extends in the direction of the longitudinal axis of the vehicle chassis to compensate for changes in a distance and an angle between the first walking beam and the second walking beam as the first walking beam pivots and as the second walking beam pivots.

17. The walking beam suspension of claim 16, wherein the third dynamic connector is dynamically adjustable by dynamically linearly moving along the axis with respect to the vehicle chassis.

18. The walking beam suspension of claim 10, wherein the first walking beam, the second walking beam, and the dynamic coupling together are adapted to support the vehicle chassis suspended above the surface independently of an external support.

19. A walking beam suspension, comprising: a first walking beam that is adapted to be pivotably connected to a first side of a vehicle chassis and to have one or more first surface contacting elements connected; wherein the first walking beam is separately pivotable in response to the one or more first surface contacting elements encountering a first deviation in a surface to maintain each of the one or more first surface contacting elements in contact with the surface; a second walking beam that is adapted to be pivotably connected to a second side of the vehicle chassis and to have one or more second surface contacting elements connected; wherein the second walking beam is separately pivotable in response to the one or more second surface contacting elements encountering a second deviation in the surface to maintain each of the one or more second surface contacting elements in contact with the surface; and a dynamic coupling connected to the first walking beam and to the second walking beam, and adapted to be connected to the vehicle chassis; wherein the dynamic coupling is dynamically adjustable to reduce movement of the vehicle chassis from pivoting of the first walking beam and pivoting of the second walking beam; wherein the dynamic coupling is adapted to be connected to the vehicle chassis by a first dynamic connector that is dynamically pivotable with respect to the vehicle chassis.

20. The walking beam suspension of claim 19, wherein the dynamic coupling is connected to the first walking beam by a second dynamic connector and is connected to the second walking beam by a third dynamic connector.

21. The walking beam suspension of claim 19, wherein the dynamic coupling is connected to the first walking beam by a first dynamic telescopic connector that is dynamically extendable and retractable and is connected to the second walking beam by a second dynamic telescopic connector that is dynamically extendable and retractable.

22. A walking beam suspension, comprising: a first walking beam that is adapted to be pivotably connected to a first side of a vehicle chassis and to have one or more first surface contacting elements connected; wherein the first walking beam is separately pivotable in response to the one or more first surface contacting elements encountering a first deviation in a surface to maintain each of the one or more first surface contacting elements in contact with the surface; a second walking beam that is adapted to be pivotably connected to a second side of the vehicle chassis and to have one or more second surface contacting elements connected; wherein the second walking beam is separately pivotable in response to the one or more second surface contacting elements encountering a second deviation in the surface to maintain each of the one or more second surface contacting elements in contact with the surface; and a dynamic coupling connected to the first walking beam and to the second walking beam, and adapted to be connected to the vehicle chassis; wherein the dynamic coupling is dynamically adjustable to reduce movement of the vehicle chassis from pivoting of the first walking beam and pivoting of the second walking beam; wherein the dynamic coupling is adapted to be connected to the vehicle chassis by a first dynamic connector that is dynamically linearly movable with respect to the vehicle chassis.

23. The walking beam suspension of claim 22, wherein the dynamic coupling is connected to the first walking beam by a second dynamic connector and is connected to the second walking beam by a third dynamic connector.

24. The walking beam suspension of claim 22, wherein the dynamic coupling is connected to the first walking beam by a first dynamic telescopic connector that is dynamically extendable and retractable and is connected to the second walking beam by a second dynamic telescopic connector that is dynamically extendable and retractable.

25. A walking beam suspension, comprising: a first walking beam that is adapted to be pivotably connected to a first side of a vehicle chassis and to have one or more first surface contacting elements connected; wherein the first walking beam is separately pivotable in response to the one or more first surface contacting elements encountering a first deviation in a surface to maintain each of the one or more first surface contacting elements in contact with the surface; a second walking beam that is adapted to be pivotably connected to a second side of the vehicle chassis and to have one or more second surface contacting elements connected; wherein the second walking beam is separately pivotable in response to the one or more second surface contacting elements encountering a second deviation in the surface to maintain each of the one or more second surface contacting elements in contact with the surface; and a dynamic coupling connected to the first walking beam and to the second walking beam, and adapted to be connected to the vehicle chassis; wherein the dynamic coupling is dynamically adjustable to reduce movement of the vehicle chassis from pivoting of the first walking beam and pivoting of the second walking beam; wherein the dynamic coupling is adapted to be connected to the vehicle chassis by a first dynamic connector that is dynamically pivotable and linearly movable with respect to the vehicle chassis.

26. The walking beam suspension of claim 25, wherein the dynamic coupling is connected to the first walking beam by a second dynamic connector and is connected to the second walking beam by a third dynamic connector.

27. The walking beam suspension of claim 25, wherein the dynamic coupling is connected to the first walking beam by a first dynamic telescopic connector that is dynamically extendable and retractable and is connected to the second walking beam by a second dynamic telescopic connector that is dynamically extendable and retractable.

* * * * *